US012700300B2

(12) United States Patent
Fei et al.

(10) Patent No.: US 12,700,300 B2
(45) Date of Patent: Aug. 4, 2026

(54) METHODS AND APPARATUSES FOR GENERATING AND USING SENSING CAPABILITY INFORMATION

(71) Applicant: Yinwang Intelligent Technologies Co., Ltd., Shenzhen (CN)

(72) Inventors: Wenkai Fei, Beijing (CN); Jianqin Liu, Beijing (CN); Yong Wu, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 18/425,360

(22) Filed: Jan. 29, 2024

(65) Prior Publication Data

US 2024/0169826 A1 May 23, 2024

Related U.S. Application Data

(63) Continuation of application No. PCT/CN2022/104411, filed on Jul. 7, 2022.

(30) Foreign Application Priority Data

Jul. 30, 2021 (CN) ......................... 202110874062.5

(51) Int. Cl.
*G08G 1/00* (2006.01)
*G08G 1/01* (2006.01)

(52) U.S. Cl.
CPC ......... *G08G 1/0116* (2013.01); *G08G 1/0141* (2013.01)

(58) Field of Classification Search
None
See application file for complete search history.

(56) References Cited

U.S. PATENT DOCUMENTS

| | | | | |
|---|---|---|---|---|
| 2019/0049992 | A1* | 2/2019 | Riess | G05D 1/0276 |
| 2019/0222652 | A1* | 7/2019 | Graefe | H04L 67/12 |
| 2019/0302768 | A1 | 10/2019 | Zhang et al. | |
| 2020/0003907 | A1* | 1/2020 | Eriksson | G01S 19/485 |
| 2020/0247402 | A1* | 8/2020 | Bouton | B60W 60/0011 |
| 2020/0409372 | A1 | 12/2020 | Yu et al. | |
| 2021/0099831 | A1 | 4/2021 | Gong et al. | |
| 2021/0347387 | A1* | 11/2021 | Avedisov | B60W 40/04 |

(Continued)

FOREIGN PATENT DOCUMENTS

| | | | |
|---|---|---|---|
| CN | 108762245 | A | 11/2018 |
| CN | 111210623 | A | 5/2020 |

(Continued)

*Primary Examiner* — Truc M Do
(74) *Attorney, Agent, or Firm* — Conley Rose, P.C.

(57) ABSTRACT

A method includes obtaining a roadside sensing result that indicates a first group of location points that are of a traffic participant sensed by a first roadside device in a preset time period, and a multi-source fusion sensing result that indicates a second group of location points obtained by fusing a plurality of groups of location points that are of the traffic participant and that are obtained by a plurality of sensing devices in the preset time period; matching the roadside sensing result with the multi-source fusion sensing result; and generating first sensing capability information of the first roadside device based on the matching result.

20 Claims, 13 Drawing Sheets

(56) References Cited

U.S. PATENT DOCUMENTS

| | | | |
|---|---|---|---|
| 2022/0044564 | A1 | 2/2022 | Zhang |
| 2022/0252420 | A1 | 8/2022 | Shen et al. |

FOREIGN PATENT DOCUMENTS

| | | | |
|---|---|---|---|
| CN | 111753765 | A | 10/2020 |
| CN | 111951582 | A | 11/2020 |
| CN | 112584314 | A | 3/2021 |
| CN | 112712717 | A | 4/2021 |
| CN | 112712719 | A | 4/2021 |
| CN | 115905431 | A | 4/2023 |

* cited by examiner

METHODS AND APPARATUSES FOR GENERATING AND USING SENSING CAPABILITY INFORMATION

CROSS-REFERENCE TO RELATED APPLICATIONS

This application is a continuation application of International Patent Application No. PCT/CN2022/104411 filed on Jul. 7, 2022, which claims priority to Chinese Patent Application No. 202110874062.5 filed on Jul. 30, 2021. The disclosures of the aforementioned applications are hereby incorporated by reference in their entireties.

TECHNICAL FIELD

This application relates to the field of intelligent transportation, intelligent driving, and map technologies, and in particular, to methods and apparatuses for generating and using sensing capability information.

BACKGROUND

To sense a road environment is primary in a self-driving or an assisted driving process. A self-driving or an assisted-driving vehicle may use a high-definition map as basic reference information for driving. Information layers in the high-definition map are classified into a static layer and a dynamic layer. The static layer is used to reflect static information such as a specific lane model and a building. The dynamic layer is used to reflect dynamic information such as a signal light status and a road condition.

Sensing information provided by a roadside device may be used as reference information for decision-making in and control of intelligent driving. Therefore, a sensing capability of the roadside device is an important factor that affects intelligent driving safety.

Generally, a device manufacturer marks a sensing range of a roadside device when the roadside device is delivered from a factory. The sensing range of the roadside device is related to factors such as an installation angle, an algorithm capability, and deployment density. Consequently, there is a deviation between an actual sensing range of the roadside device and a sensing range designed before delivery. However, road conditions and blocking scenarios are complex, and it is difficult to test a sensing range of a roadside device on an actual road. In addition, there are a large quantity of roadside devices. Therefore, a large quantity of human and material resources are used to separately test a sensing range at each installation point, which is impractical. How to conveniently and accurately determine an actual sensing range of a roadside device is an urgent problem to be resolved currently.

SUMMARY

In view of this, methods and apparatuses for generating and using sensing capability information are provided, to conveniently and accurately obtain a sensing range of a roadside device.

According to a first aspect, an embodiment of this application provides a method for generating sensing capability information. The method includes obtaining a roadside sensing result and a multi-source fusion sensing result, where the roadside sensing result indicates a first group of location points that are of a traffic participant sensed by a first roadside device in a preset time period, and the multi-source fusion sensing result indicates a second group of location points obtained by fusing a plurality of groups of location points that are of the traffic participant and that are obtained by a plurality of sensing devices in the preset time period, matching the roadside sensing result with the multi-source fusion sensing result, to obtain matching results of a plurality of target location points, and generating first sensing capability information of the first roadside device based on the matching results, wherein the first sensing capability information indicates a sensing capability of the first roadside device. The plurality of sensing devices may be of at least one type of the following devices: a roadside device, a vehicle, or a portable terminal. In an example, the plurality of sensing devices may be a plurality of roadside devices, a plurality of vehicles, a plurality of portable terminals, or a plurality of sensing devices of two or three types of the following devices: the roadside device, the vehicle, and the portable terminal.

In this embodiment of this application, location points that are of a traffic participant sensed by the first roadside device are matched with location points that are of the traffic participant sensed by a plurality of sensing devices in a same preset time period. In this way, performance of the first roadside device in sensing a traffic participant that actually exists can be determined, and therefore the sensing capability of the first roadside device is determined.

The first group of location points may be location points that are of the traffic participant sensed by one sensor in the first roadside device, or may be a group of location points obtained by fusing, in the first roadside device, a plurality of groups of location points that are of the traffic participant sensed by a plurality of sensors in the first roadside device.

According to the first aspect, in a first possible implementation of the method for generating sensing capability information, the first sensing capability information indicates a first region and a sensing capability of the first roadside device in the first region.

According to the first aspect, in a second possible implementation of the method for generating sensing capability information, the first sensing capability information indicates a first scenario, a first region, and a sensing capability of the first roadside device in the first scenario in the first region.

According to the first aspect or any one of the foregoing possible implementations of the first aspect, in a third possible implementation of the method for generating sensing capability information, the roadside sensing result and the multi-source fusion sensing result are sensing results in a same scenario.

According to the first aspect or any one of the foregoing possible implementations of the first aspect, in a fourth possible implementation of the method for generating sensing capability information, the roadside sensing result includes at least one of time information, location information, a motion parameter, and attribute information of each location point in the first group of location points, and the multi-source fusion sensing result includes at least one of time information, location information, a motion parameter, and attribute information of each location point in the second group of location points.

According to the first aspect or any one of the foregoing possible implementations of the first aspect, in a fifth possible implementation of the method for generating sensing capability information, the method further includes generating a plurality of pieces of sensing capability information for a plurality of roadside devices, where the plurality of pieces of sensing capability information indicate sensing capabilities of the plurality of roadside devices, the plurality of roadside devices include the first roadside device, and the plurality of pieces of sensing capability information include the first sensing capability information, and generating sensing coverage hole information based on the plurality of pieces of sensing capability information, where the sensing coverage hole information indicates a region out of coverage of one or more roadside devices in the plurality of roadside devices.

According to the fifth possible implementation of the first aspect, in a sixth possible implementation of the method for generating sensing capability information, the region out of coverage of one or more roadside devices in the plurality of roadside devices includes an absolute coverage hole and/or a relative coverage hole, a sensing capability of each of the plurality of roadside devices cannot meet a sensing capability criterion in the absolute coverage hole, and sensing capabilities of some of the plurality of roadside devices cannot meet the sensing capability criterion in the relative coverage hole.

According to the first aspect or any one of the foregoing possible implementations of the first aspect, in a seventh possible implementation of the method for generating sensing capability information, the method further includes updating the first sensing capability information when a preset condition is met, where the preset condition includes a current value, indicated by the first sensing capability information, of a sensing capability indicator is abnormal relative to a statistical value of the sensing capability indicator, fault maintenance is performed on the first roadside device, a sensor of the first roadside device is replaced, or the first roadside device is upgraded.

According to the first aspect or any one of the foregoing possible implementations of the first aspect, in an eighth possible implementation of the method for generating sensing capability information, the method further includes generating warning prompt information based on the first sensing capability information, where the warning prompt information is used to prompt a driver to take over a vehicle in a second region, perform fault detection on the first roadside device, update software of the first roadside device, adjust deployment of the first roadside device, reduce confidence of information that is about a second region and that is sensed by the first roadside device, or bypass a second region during route planning, wherein the first sensing capability information indicates that a sensing capability of the first roadside device in the second region is lower than a sensing threshold.

According to the first aspect or any one of the foregoing possible implementations of the first aspect, in a ninth possible implementation of the method for generating sensing capability information, a target location point is a location point in the first group of location points or a location point in the second group of location points. A matching result of the target location point is true positive (TP), false negative (FN), or false positive (FP). A matching result of TP for the target location point indicates that the target location point is a location point in the second group of location points, and there is a location point that is in the first group of location points and that matches the target location point. A matching result of FN for the target location point indicates that the target location point is a location point in the second group of location points, and there is no location point that is in the first group of location points and that matches the target location point. A matching result of FP for the target location point indicates that the target location point is a location point in the first group of location points, and there is no location point that is in the second group of location points and that matches the target location point.

According to the seventh possible implementation of the first aspect, in a tenth possible implementation of the method for generating sensing capability information, that a current value, indicated by the first sensing capability information, of a sensing capability indicator is abnormal relative to a statistical value of the sensing capability indicator includes a difference between a first sensing region and a second sensing region that correspond to a target sensing capability level is greater than a first difference threshold corresponding to the target sensing capability level. The target sensing capability level is any one of sensing capability levels for the first roadside device, the first sensing region is a sensing region corresponding to the target sensing capability level indicated by the current value of the sensing capability indicator, and the second sensing region is a sensing region corresponding to the target sensing capability level indicated by the statistical value of the sensing capability indicator.

According to the seventh possible implementation of the first aspect, in an eleventh possible implementation of the method for generating sensing capability information, that a current value, indicated by the first sensing capability information, of a sensing capability indicator is abnormal relative to a statistical value of the sensing capability indicator includes, in a sensing region corresponding to a target sensing capability level indicated by the statistical value of the sensing capability indicator, a proportion of a quantity of first target location points obtained by matching a current roadside sensing result with a current multi-source fusion sensing result to a quantity of location points in a second group of location points indicated by the current multi-source fusion sensing result is lower than a third difference threshold. The current roadside sensing result is a roadside sensing result obtained in a process of generating the current value of the sensing capability indicator, and the current multi-source fusion sensing result is a multi-source fusion sensing result obtained in a process of generating the current value of the sensing capability indicator. The first target location point is a target location point whose matching result is FN.

The method for generating sensing capability information according to the first aspect or any one of the implementations of the first aspect may be performed by a server, a component in the server, a software module, a hardware module, or a chip, or may be performed by the roadside device, a component in the roadside device, a software module, a hardware module, or a chip. This is not limited herein.

According to a second aspect, an embodiment of this application provides a method for using sensing capability information. The method includes obtaining sensing capability information, where the sensing capability information indicates a region and a sensing capability of a roadside device in the region, and based on the sensing capability information, generating warning prompt information, adjusting confidence of information that is about the region and that is sensed by the roadside device, or planning a driving route that bypasses the region. Obtaining of the sensing capability information may be receiving the sensing capability information or generating the sensing capability information.

According to the second aspect, in a first possible implementation of the method for using sensing capability information, the sensing capability information further indicates a scenario and a sensing capability of the roadside device in the scenario in the region.

According to the second aspect or the first possible implementation of the second aspect, in a second possible implementation of the method for using sensing capability information, the warning prompt information is used to prompt a driver to take over a vehicle in the region, avoid a vehicle in the region, perform fault detection on the roadside device, reduce the confidence of the information that is about the region and that is sensed by the roadside device, or bypass the region during route planning, where the sensing capability information indicates that the sensing capability of the roadside device in the region is lower than a sensing threshold.

According to the second aspect or the first possible implementation of the second aspect, in a third possible implementation of the method for using sensing capability information, the method is performed by an in-vehicle device, and generating warning prompt information based on the sensing capability information includes determining that the sensing capability is lower than a sensing threshold, and prompting a driver to take over a vehicle in the region.

According to the second aspect or the first possible implementation of the second aspect, in a fourth possible implementation of the method for using sensing capability information, the method is performed by an in-vehicle device, and planning, based on the sensing capability information, a driving route that bypasses the region includes determining that the sensing capability is lower than a sensing threshold, and planning the driving route, where the driving route bypasses the region.

According to the second aspect or the first possible implementation of the second aspect, in a fifth possible implementation of the method for using sensing capability information, the method is performed by a mobile terminal, and generating warning prompt information based on the sensing capability information includes determining that the sensing capability is lower than a sensing threshold, and prompting a user of the mobile terminal to avoid a vehicle in the region.

According to the second aspect or the first possible implementation of the second aspect, in a sixth possible implementation of the method for using sensing capability information, the method is performed by a management device of the roadside device, and generating warning prompt information based on the sensing capability information includes determining that the sensing capability is lower than a sensing threshold, and prompting an administrator to perform fault detection on the roadside device, update software of the roadside device, or adjust deployment of the roadside device.

According to the second aspect or any one of the first possible implementation to the sixth possible implementation of the second aspect, in a seventh possible implementation of the method for using sensing capability information, there are a plurality of roadside devices, and the region includes an absolute coverage hole, where the absolute coverage hole is a region in which a sensing capability of a sensing capability of each of the plurality of roadside devices cannot meet a sensing capability criterion.

According to the second aspect or any one of the first possible implementation to the fifth possible implementation of the second aspect, in an eighth possible implementation of the method for using sensing capability information, there are a plurality of roadside devices, and the region includes a relative coverage hole, where the relative coverage hole is a region in which sensing capabilities of sensing capabilities of some of the plurality of roadside devices cannot meet a sensing capability criterion.

The method for using sensing capability information according to the second aspect or any one of the implementations of the second aspect may be performed by a server, a component in the server, a software module, a hardware module, or a chip, may be performed by the roadside device, a component in the roadside device, a software module, a hardware module, or a chip, may be performed by the vehicle, a component in the vehicle, a software module, a hardware module, or a chip, or may be performed by a portable terminal, a component in the portable terminal, a software module, a hardware module, or a chip. This is not limited herein.

According to a third aspect, an embodiment of this application provides an apparatus for generating sensing capability information. The apparatus includes an obtaining module configured to obtain a roadside sensing result and a multi-source fusion sensing result, where the roadside sensing result indicates a first group of location points that are of a traffic participant sensed by a first roadside device in a preset time period, and the multi-source fusion sensing result indicates a second group of location points obtained by fusing a plurality of groups of location points that are of the traffic participant and that are obtained by a plurality of sensing devices in the preset time period, a matching module configured to match the roadside sensing result obtained by the obtaining module with the multi-source fusion sensing result obtained by the obtaining module, to obtain matching results of a plurality of target location points, and a first generation module configured to generate first sensing capability information of the first roadside device based on the matching results obtained by the matching module, where the first sensing capability information indicates a sensing capability of the first roadside device.

According to the third aspect, in a first possible implementation of the apparatus for generating sensing capability information, the first sensing capability information indicates a first region and a sensing capability of the first roadside device in the first region.

According to the third aspect, in a second possible implementation of the apparatus for generating sensing capability information, the first sensing capability information indicates a first scenario, a first region, and a sensing capability of the first roadside device in the first scenario in the first region.

According to the third aspect or any one of the foregoing possible implementations of the third aspect, in a third possible implementation of the apparatus for generating sensing capability information, the roadside sensing result and the multi-source fusion sensing result are sensing results in a same scenario.

According to the third aspect or any one of the foregoing possible implementations of the third aspect, in a fourth possible implementation of the apparatus for generating sensing capability information, the roadside sensing result includes at least one of time information, location information, a motion parameter, and attribute information of each location point in the first group of location points, and the multi-source fusion sensing result includes at least one of time information, location information, a motion parameter, and attribute information of each location point in the second group of location points.

According to the third aspect or any one of the foregoing possible implementations of the third aspect, in a fifth possible implementation of the apparatus for generating sensing capability information, the apparatus further includes a second generation module configured to generate a plurality of pieces of sensing capability information for a plurality of roadside devices, where the plurality of pieces of sensing capability information indicate sensing capabilities of the plurality of roadside devices, the plurality of roadside devices include the first roadside device, and the plurality of pieces of sensing capability information include the first sensing capability information, and a third generation module configured to generate sensing coverage hole information based on the plurality of pieces of sensing capability information, where the sensing coverage hole information indicates a region out of coverage of one or more roadside devices in the plurality of roadside devices.

According to the fifth possible implementation of the third aspect, in a sixth possible implementation of the apparatus for generating sensing capability information, the region out of coverage of one or more roadside devices in the plurality of roadside devices includes an absolute coverage hole and/or a relative coverage hole, a sensing capability of each of the plurality of roadside devices cannot meet a sensing capability criterion in the absolute coverage hole, and sensing capabilities of some of the plurality of roadside devices cannot meet the sensing capability criterion in the relative coverage hole.

According to the third aspect or any one of the foregoing possible implementations of the third aspect, in a seventh possible implementation of the apparatus for generating sensing capability information, the apparatus further includes an updating module configured to update the first sensing capability information when a preset condition is met, where the preset condition includes a current value, indicated by the first sensing capability information, of a sensing capability indicator is abnormal relative to a statistical value of the sensing capability indicator, fault maintenance is performed on the first roadside device, a sensor of the first roadside device is replaced, or the first roadside device is upgraded.

According to the third aspect or any one of the foregoing possible implementations of the third aspect, in an eighth possible implementation of the apparatus for generating sensing capability information, the apparatus further includes a fourth generation module configured to generate warning prompt information based on the first sensing capability information, where the warning prompt information is used to prompt a driver to take over a vehicle in a second region, perform fault detection on the first roadside device, update software of the first roadside device, adjust deployment of the first roadside device, reduce confidence of information that is about a second region and that is sensed by the first roadside device, or bypass a second region during route planning, where the first sensing capability information indicates that a sensing capability of the first roadside device in the second region is lower than a sensing threshold.

The apparatus for generating sensing capability information according to the third aspect or any one of the implementations of the third aspect may be a server, a component in the server, a software module, a hardware module, or a chip, or may be the roadside device, a component in the roadside device, a software module, a hardware module, or a chip. This is not limited herein.

According to a fourth aspect, an embodiment of this application provides an apparatus for using sensing capability information. The apparatus includes an obtaining module configured to obtain sensing capability information, where the sensing capability information indicates a region and a sensing capability of a roadside device in the region, and an execution module configured to, based on the sensing capability information obtained by the obtaining module, generate warning prompt information, adjust confidence of information that is about the region and that is sensed by the roadside device, or plan a driving route that bypasses the region. Obtaining of the sensing capability information may be receiving the sensing capability information or generating the sensing capability information.

According to the fourth aspect, in a first possible implementation of the apparatus for using sensing capability information, the sensing capability information further indicates a scenario and a sensing capability of the roadside device in the scenario in the region.

According to the fourth aspect or the first possible implementation of the fourth aspect, in a second possible implementation of the apparatus for using sensing capability information, the warning prompt information is used to prompt a driver to take over a vehicle in the region, avoid a vehicle in the region, perform fault detection on the roadside device, reduce the confidence of the information that is about the region and that is sensed by the roadside device, or bypass the region during route planning, where the sensing capability information indicates that the sensing capability of the roadside device in the region is lower than a sensing threshold.

According to the fourth aspect or the first possible implementation of the fourth aspect, in a third possible implementation of the apparatus for using sensing capability information, that the warning prompt information is generated based on the sensing capability information includes determining that the sensing capability is lower than a sensing threshold, and prompting a driver to take over a vehicle in the region.

According to the fourth aspect or the first possible implementation of the fourth aspect, in a fourth possible implementation of the apparatus for using sensing capability information, the apparatus is in an in-vehicle device, and that the driving route that bypasses the region is planned based on the sensing capability information includes determining that the sensing capability is lower than a sensing threshold, and planning the driving route, where the driving route bypasses the region.

According to the fourth aspect or the first possible implementation of the fourth aspect, in a fifth possible implementation of the apparatus for using sensing capability information, the apparatus is in a mobile terminal, and that the warning prompt information is generated based on the sensing capability information includes determining that the sensing capability is lower than a sensing threshold, and prompting a user of the mobile terminal to avoid a vehicle in the region.

According to the fourth aspect or the first possible implementation of the fourth aspect, in a sixth possible implementation of the apparatus for using sensing capability information, the apparatus is in a management device of the roadside device, and that the warning prompt information is generated based on the sensing capability information includes determining that the sensing capability is lower than a sensing threshold, and prompting an administrator to perform fault detection on the roadside device, updating software of the roadside device, or adjusting deployment of the roadside device.

According to the fourth aspect or any one of the first possible implementation to the sixth possible implementation of the fourth aspect, in a seventh possible implementation of the apparatus for using sensing capability information, there are a plurality of roadside devices, and the region includes an absolute coverage hole, where the absolute coverage hole is a region in which a sensing capability of a sensing capability of each of the plurality of roadside devices cannot meet a sensing capability criterion.

According to the fourth aspect or any one of the first possible implementation to the fifth possible implementation of the fourth aspect, in an eighth possible implementation of the apparatus for using sensing capability information, there are a plurality of roadside devices, and the region includes a relative coverage hole, where the relative coverage hole is a region in which sensing capabilities of sensing capabilities of some of the plurality of roadside devices cannot meet a sensing capability criterion.

The apparatus for using sensing capability information according to the fourth aspect or any one of the implementations of the fourth aspect may be a server, a component in a server, a software module, a hardware module, or a chip, may be the roadside device, a component in a roadside device, a software module, a hardware module, or a chip, may be the vehicle, a component in a vehicle, a software module, a hardware module, or a chip, or may be a portable terminal, a component in the portable terminal, a software module, a hardware module, or a chip. This is not limited herein.

According to a fifth aspect, an embodiment of this application provides an apparatus for generating sensing capability information. The apparatus may perform the method for generating sensing capability information according to the first aspect or one or more of a plurality of possible implementations of the first aspect.

The apparatus for generating sensing capability information according to the fifth aspect may be a server, a component in the server, a hardware module, or a chip, or may be a roadside device, a component in the roadside device, a hardware module, or a chip. This is not limited herein.

According to a sixth aspect, an embodiment of this application provides an apparatus for using sensing capability information. The apparatus may perform the method for using sensing capability information according to the second aspect or one or more of a plurality of possible implementations of the second aspect.

The apparatus for using sensing capability information according to the sixth aspect may be a server, a component in the server, a hardware module, or a chip, may be a roadside device, a component in the roadside device, a hardware module, or a chip, may be a vehicle, a component in the vehicle, a hardware module, or a chip, or may be a portable terminal, a component in the portable terminal, a hardware module, or a chip. This is not limited herein.

According to a seventh aspect, an embodiment of this application provides a computer program product, including computer-readable code or a computer-readable storage medium carrying computer-readable code. When the computer-readable code is run in a processor, the processor performs the method for generating sensing capability information according to the first aspect or one or more of a plurality of possible implementations of the first aspect, or performs the method for using sensing capability information according to the second aspect or one or more of a plurality of possible implementations of the second aspect.

According to an eighth aspect, an embodiment of this application provides a map, including sensing capability information, where the sensing capability information indicates a region and a sensing capability of a roadside device in the region.

The map is a map product, and an example form of the map may be map data, a map database, or a map application. This is not further limited herein.

According to the eighth aspect, in a first possible implementation of the map, the sensing capability information further indicates a scenario and a sensing capability of the roadside device in the scenario in the region.

According to the eighth aspect or the first possible implementation of the eighth aspect, in a second possible implementation of the map, there are a plurality of roadside devices, and the region includes an absolute coverage hole, where the absolute coverage hole is a region in which a sensing capability of a sensing capability of each of the plurality of roadside devices cannot meet a sensing capability criterion.

According to the eighth aspect or the first possible implementation of the eighth aspect, in a third possible implementation of the map, there are a plurality of roadside devices, and the region includes a relative coverage hole, where the relative coverage hole is a region in which sensing capabilities of sensing capabilities of some of the plurality of roadside devices cannot meet a sensing capability criterion.

According to the eighth aspect or any one of the foregoing possible implementations of the eighth aspect, in a fourth possible implementation of the map, the map further includes warning prompt information, and the warning prompt information is used to prompt a driver to take over a vehicle in the region, perform fault detection on the roadside device, reduce confidence of information that is about the region and that is sensed by the roadside device, or bypass the region during route planning, where the sensing capability information indicates that the sensing capability of the roadside device in the region is lower than a sensing threshold.

According to a ninth aspect, an embodiment of this application provides a computer-readable storage medium in which the map according to the eighth aspect or one or more of a plurality of possible implementations of the eighth aspect is stored.

According to a tenth aspect, an embodiment of this application provides a vehicle, including the apparatus for using sensing capability information according to the third aspect or one or more of a plurality of possible implementations of the third aspect.

These aspects and other aspects of this application are more concise and more comprehensive in descriptions of the following (a plurality of) embodiments.

DESCRIPTION OF EMBODIMENTS

Figure 1:
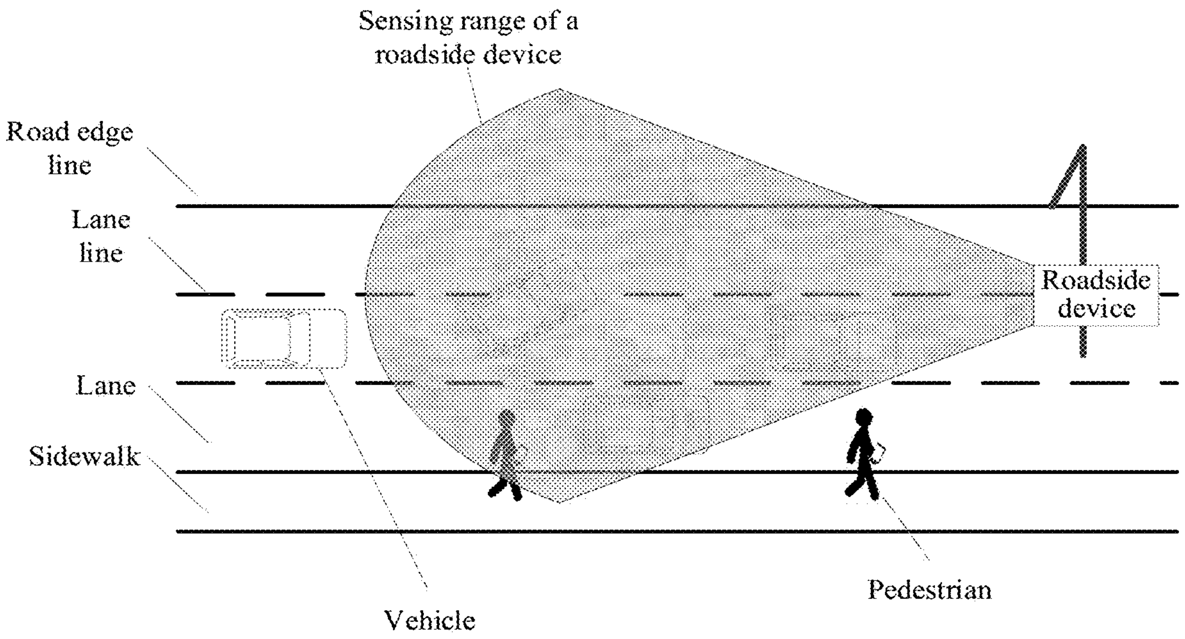
FIG. 1 is a schematic diagram of an application scenario according to an embodiment of this application.

The following describes various example embodiments, features, and aspects of this application in detail with reference to accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The term “example” herein may mean “used as an example, embodiment or illustration”. Any embodiment described as an “example” is not necessarily explained as being superior to or better than another embodiment.

In addition, to better describe this application, numerous details are given in the following implementations. A person skilled in the art should understand that this application can also be implemented without some details. In some embodiments, methods, means, elements and circuits that are well-known to a person skilled in the art are not described in detail, so that the subject matter of this application is highlighted.

FIG. 1 is a schematic diagram of an application scenario according to an embodiment of this application. As shown in FIG. 1, there are vehicles traveling on a road and pedestrians walking on a roadside. A roadside device is disposed on a roadside or above the road, to sense a traffic participant around the roadside device. An in-vehicle device may be installed or provided on the vehicle to sense another traffic participant around the vehicle. The pedestrian may carry a mobile terminal with the pedestrian, to position the pedestrian. Traffic participants include but are not limited to the vehicles and pedestrians in FIG. 1. In an example, the traffic participants may further include another person that has a direct or indirect relationship with traffic, or a transportation means used by a person that has a direct or indirect relationship with traffic, for example, a non-motor vehicle such as a bicycle. The method for generating sensing capability information in embodiments of this application can be used to conveniently and accurately obtain a sensing range of the roadside device shown in FIG. 1. This effectively facilitates self-driving, route planning, and another function of a vehicle. In addition, an accurate warning and prompt can be delivered to a pedestrian.

In this embodiment of this application, the roadside device may detect a surrounding environment from a roadside perspective, to obtain roadside sensing data. The roadside device may be provided with a roadside sensing apparatus. The roadside sensing apparatus may include at least one roadside sensor such as a microwave radar or a millimeter-wave radar, and can identify roadside sensing data such as a location, a speed, and a size of a surrounding traffic participant. The roadside sensing apparatus may further include a roadside sensor such as a camera. The camera not only can identify roadside sensing data such as a location, a speed, and a size of a surrounding traffic participant, but also can identify roadside sensing data such as a color of each traffic participant (such as a color of a vehicle or a color of clothing on a pedestrian).

It may be understood that the foregoing roadside sensors and roadside sensing data are merely examples, and do not constitute a specific limitation. The roadside sensing apparatus may include any single one of the roadside sensors, or may include any plurality of the roadside sensors simultaneously.

The roadside sensing data may include location change information of a plurality of traffic participants. Location change information of a traffic participant indicates a group of location points of the traffic participant. For example, the roadside device senses three traffic participants: a vehicle 1, a vehicle 2, and a pedestrian 1. Roadside sensing data includes location change information of the three traffic participants, that is, location change information of the vehicle 1, location change information of the vehicle 2, and location change information of the pedestrian 1, which respectively indicate a group of location points of the vehicle 1, a group of location points of the vehicle 2, and a group of location points of the pedestrian 1.

In a possible implementation, location change information of a traffic participant may include but is not limited to time information, location information, a motion parameter, and attribute information of each location point in a group of location points of the indicated traffic participant.

The time information may be a universal time coordinated (UTC) timestamp. The location information may be absolute coordinates (that is, longitude and latitude coordinates) or relative coordinates. Motion parameters include but are not limited to an acceleration, a speed, a heading angle, a turning rate, and the like. The attribute information includes but is not limited to a type (such as a vehicle, a pedestrian, or a non-motor vehicle) of the traffic participant, a geometric size (it may be understood that sizes of vehicles such as a truck, a bus, and a car differ greatly), a data source, a sensor type, a sensor model, and the like. It may be understood that different types of traffic participants may be visually presented by using different images. For example, the vehicle may be presented by using a rectangle, and the pedestrian may be presented by using a circle. Traffic participants that are of a same type but differ greatly in sizes may be presented by using graphs of different sizes. For example, the truck may be presented by using a large rectangle, and the car may be presented by using a small rectangle. The data source indicates a device from which data is obtained, for example, the roadside device, a mobile terminal to be described later, or an in-vehicle device to be described later. Further, device identifiers (such as device numbers or device names) may be used to distinguish different data sources. The sensor type includes a microwave radar, a millimeter-wave radar, a camera, or the like.

In this embodiment of this application, the in-vehicle device may detect a surrounding environment from a vehicle perspective, to obtain vehicle sensing data. The in-vehicle device may be provided with an in-vehicle sensing apparatus. The in-vehicle sensing apparatus may include at least one in-vehicle sensor, such as an integrated inertial navigation and positioning system, a microwave radar, a millimeter-wave radar, a camera, or the like. Different in-vehicle sensors may detect different vehicle sensing data. For example, the in-vehicle sensing apparatus can identify vehicle sensing data such as a location and a speed of a surrounding traffic participant through the integrated inertial navigation and positioning system. The in-vehicle sensing apparatus can identify vehicle sensing data such as a location, a speed, and a size of a surrounding traffic participant through the microwave radar and the millimeter-wave radar. The in-vehicle sensing apparatus can identify vehicle sensing data such as a location, a speed, a size, and a color of a surrounding traffic participant through the camera.

It may be understood that the foregoing in-vehicle sensors and vehicle sensing data are merely examples, and do not constitute a specific limitation. The in-vehicle sensing apparatus may include any single one of the in-vehicle sensors, or may include any plurality of the in-vehicle sensors simultaneously.

The vehicle sensing data may also include location change information of a plurality of traffic participants. Location change information of a traffic participant indicates a group of location points of the traffic participant. For the location change information included in the vehicle sensing data, refer to the location change information included in the roadside sensing data. Details are not described herein.

In a possible implementation, a vehicle positioning apparatus such as a Global Positioning System (GPS) or a BEIDOU navigation satellite system (BDS) may be further configured in the in-vehicle device. The vehicle positioning apparatus may be configured to obtain vehicle location data. The vehicle location data may indicate a group of location points of a vehicle, and time information, location information, a motion parameter, attribute information, and the like of each location point in the group of location points.

In this embodiment of this application, the mobile terminal may be a portable terminal having a positioning function. For example, the mobile terminal may be a mobile phone, a tablet, a wearable device (such as a smartwatch, a smart headset, or smart glasses), a navigation device, or the like. The mobile terminal is provided with a terminal positioning apparatus. The terminal positioning apparatus includes but is not limited to the GPS, the BDS, a cellular network, or the like. The mobile terminal may obtain terminal location data through the terminal positioning apparatus. The terminal positioning data may indicate a group of location points of the vehicle, and time information, location information, a motion parameter, attribute information, and the like of each location point in the group of location points.

It should be noted that the roadside device, the in-vehicle device, and the mobile terminal are merely examples for describing a sensing device in embodiments of this application, and do not constitute a specific limitation. In embodiments of this application, the sensing device may alternatively be another device that can sense a traffic participant or position a traffic participant.

As shown in FIG. 1, the roadside device may sense surrounding traffic participants such as a vehicle and a pedestrian. It may be understood that a sensing range of the roadside device is limited. When a traffic participant is far away from the roadside device, or there is an obstacle (such as a building) between the traffic participant and the roadside device, the roadside device may not be able to accurately sense the traffic participant. When a traffic participant is close to the roadside device and there is no obstacle between the traffic participant and the roadside device, the roadside device can accurately sense the traffic participant. A sensing capability of a roadside device indicates a sensing range of the roadside device. If the roadside device can accurately sense a traffic participant in a region, it indicates that the region is within the sensing range of the roadside device. If the roadside device cannot accurately sense a traffic participant in a region, it indicates that the region is outside the sensing range of the roadside device. The method for generating sensing capability information in embodiments of this application can be used to conveniently and accurately obtain a sensing range of a roadside device. This effectively facilitates self-driving, route planning, and another function of a vehicle. In addition, an accurate warning and prompt can be delivered to a pedestrian.

Figure 2:
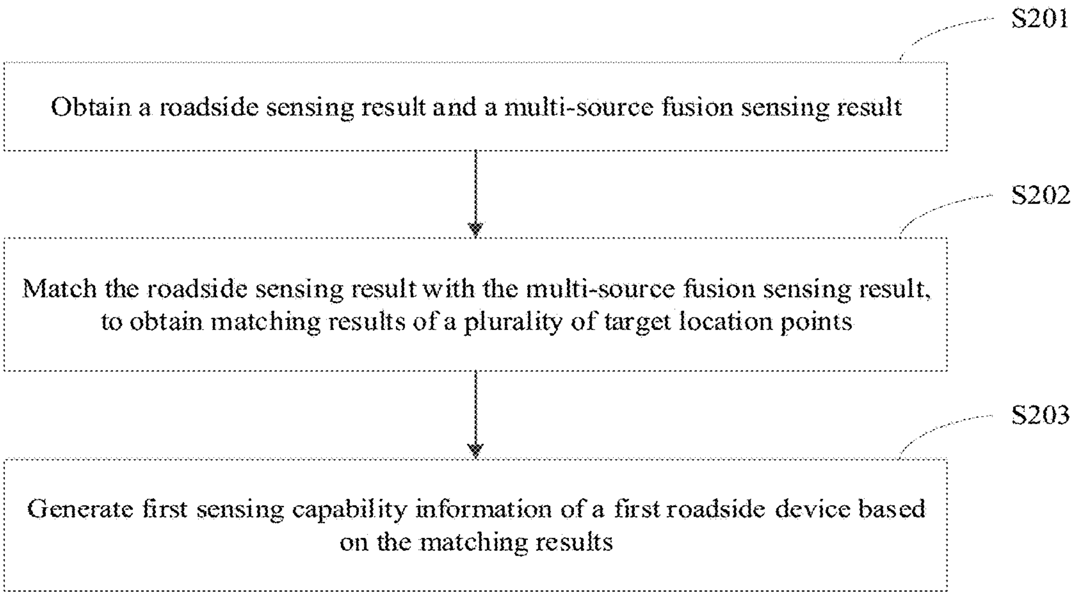
FIG. 2 is a flowchart of a method for generating sensing capability information according to an embodiment of this application.

FIG. 2 is a flowchart of a method for generating sensing capability information according to an embodiment of this application. As shown in FIG. 2, the method includes the following steps.

Step S201: Obtain a roadside sensing result and a multi-source fusion sensing result.

Step S202: Match the roadside sensing result with the multi-source fusion sensing result, to obtain matching results of a plurality of target location points.

Step S203: Generate first sensing capability information of a first roadside device based on the matching results.

The first roadside device is a roadside device whose sensing capability needs to be determined. The first roadside device may be any roadside device. The first sensing capability information may be sensing capability information of the first roadside device. The first sensing capability information may indicate a sensing capability of the first roadside device, for example, a region that can be sensed by the first roadside device and a region that cannot be sensed by the first roadside device. The first sensing capability information may be generated based on the matching results between the roadside sensing result and the multi-source fusion sensing result.

The roadside sensing result may indicate a first group of location points that are of a traffic participant sensed by the first roadside device in a preset time period. The first group of location points may be location points that are of the traffic participant sensed by one sensor in the first roadside device, or may be a group of location points obtained by fusing, in the first roadside device, a plurality of groups of location points that are of the traffic participant sensed by a plurality of sensors in the first roadside device.

The multi-source fusion sensing result may indicate a second group of location points obtained by fusing a plurality of groups of location points that are of the traffic participant and that are obtained by a plurality of sensing devices in the preset time period. The plurality of sensing devices may be of at least one type of the following devices: a roadside device, a vehicle, or a portable terminal (or a mobile terminal). In an example, the plurality of sensing devices may be a plurality of roadside devices, a plurality of vehicles, a plurality of portable terminals, or a plurality of sensing devices of two or three types of the following devices: the roadside device, the vehicle, and the portable terminal.

The preset time period may be any time period. For example, the preset time period may be one month, one week, one day, or the like. The preset time period may be set based on a requirement. This is not limited in this application. It may be understood that the obtained first sensing capability information is more accurate if a longer preset time period and a larger quantity of location points of the traffic participant are used.

The roadside sensing result and the multi-source fusion sensing result are sensing results of a traffic participant around a same roadside device in a same time period. The roadside sensing result reflects a traffic participant actually sensed by the first roadside device in the preset time period. Data used for the multi-source fusion sensing result comes from a plurality of sensing devices, and reflects a traffic participant actually sensed by the plurality of sensing devices in the preset time period. These sensing devices compensate for each other in terms of perspectives and weaknesses. Therefore, the multi-source fusion sensing result has high confidence, and can be used as a reference for the roadside sensing result, to determine whether the roadside sensing result is accurate. In this way, the sensing capability of the first roadside device is determined. It may be understood that, if the first roadside device accurately senses traffic participants indicated by the multi-source fusion sensing result, it indicates that the traffic participants are within a sensing range of the first roadside device. If the first roadside device does not sense the traffic participants indicated by the multi-source fusion sensing result, it indicates that the traffic participants are outside the sensing range of the first roadside device. For example, a pedestrian crosses a roadside green belt, but does not report location information of the pedestrian by using a mobile terminal. In addition, the pedestrian is partially blocked by a plant, and is not recognized by vehicles at some angles. However, the pedestrian is recognized by vehicles at other angles. Therefore, the pedestrian is included in the multi-source fusion sensing result. If the pedestrian is also included in the roadside sensing result, it indicates that the pedestrian is within the sensing range of the first roadside device. If the pedestrian is not included in the roadside sensing result, it indicates that the pedestrian is outside the sensing range of the first roadside device. Therefore, the roadside sensing result of the first roadside device is matched with the multi-source fusion sensing result, to conveniently and accurately determine the sensing range of the first roadside device.

The following describes processes of obtaining the roadside sensing result and the multi-source fusion sensing result. The foregoing method may be performed by a cloud server or the first roadside device. The processes of obtaining the roadside sensing result and the multi-source fusion sensing result are described herein with reference to schematic diagrams of system structures shown in FIG. 3A to FIG. 3C.

Figure 3A:
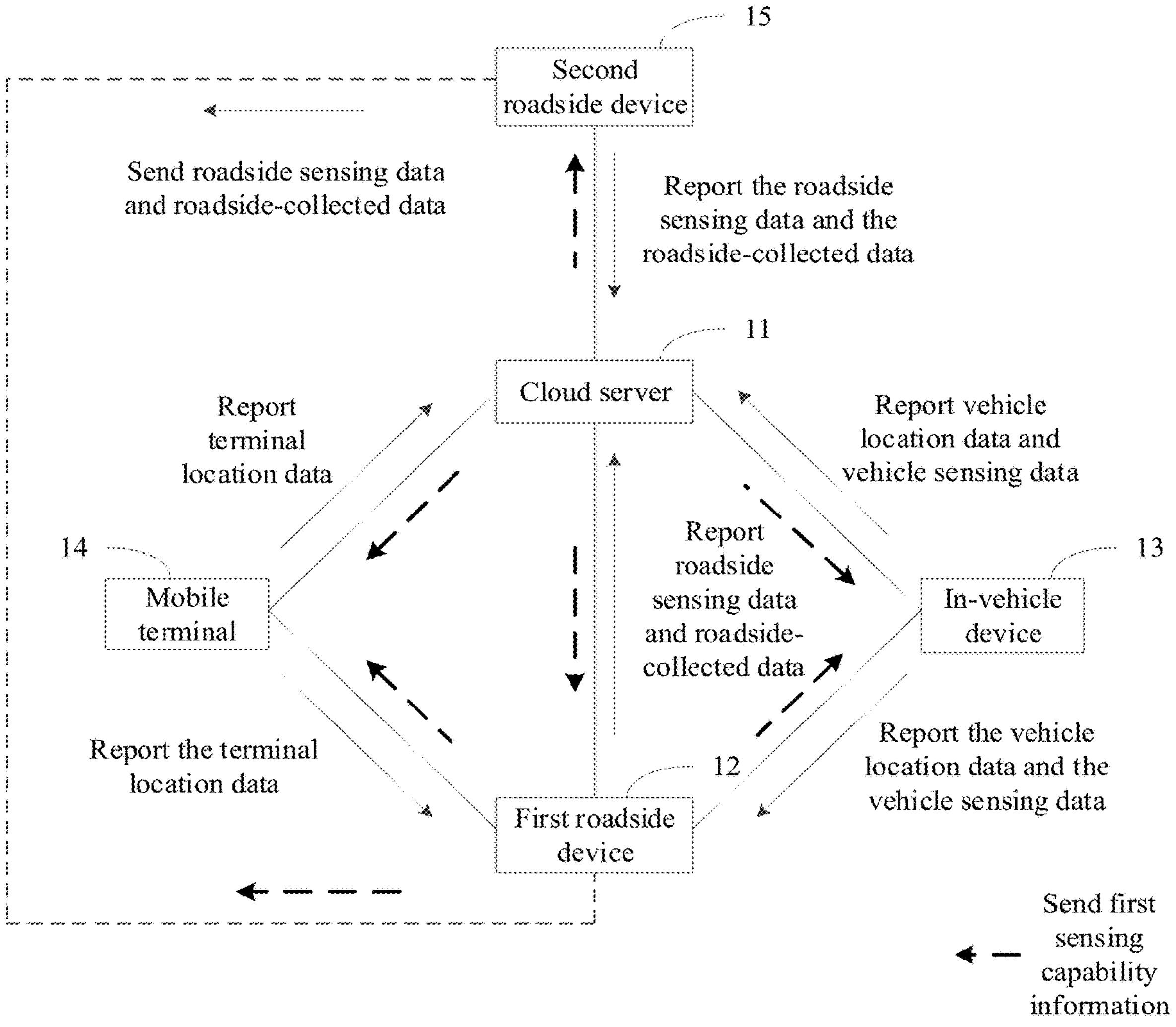
FIG. 3A is a schematic diagram depicting a structure of a communication system according to an embodiment of this application.

FIG. 3A is a schematic diagram depicting a structure of a communication system according to an embodiment of this application. As shown in FIG. 3A, the communication system includes a cloud server 11, a first roadside device 12, an in-vehicle device 13, a mobile terminal 14, and a second roadside device 15. The first roadside device 12 may be any roadside device. The second roadside device 15 may be a roadside device, other than the first roadside device 12, that establishes a communication connection to the cloud server 11. There may be one or more second roadside devices 15. The second roadside device 15 may establish a communication connection to the first roadside device 12, or may not establish a communication connection to the first roadside device 12. For ease of understanding, in this embodiment of this application, a roadside device that is in the second roadside devices 15 and that establishes a communication connection to the first roadside device 12 is referred to as a third roadside device.

As shown in FIG. 3A, the first roadside device 12, the second roadside device 15, the in-vehicle device 13, and the mobile terminal 14 each establish a communication connection to the cloud server 11. Further, the in-vehicle device 13 and the mobile terminal 14 each establish a communication connection to the first roadside device 12. In an example, the first roadside device 12, the second roadside device 15, the in-vehicle device 13, and the mobile terminal 14 each may establish a communication connection to the cloud server 11 through a cellular network (such as a third generation (3G), fourth generation (4G), or fifth generation (5G) network). A communication connection may also be established between the mobile terminal 14 and the first roadside device 12 through a cellular network. A communication connection may be established between the in-vehicle device 13 and the first roadside device 12 through an internet-of-vehicles (IoV) technology or Vehicle-to-everything (V2X) technology such as a dedicated short-range communication (DSRC) technology. Further, the communication connection may be established between the in-vehicle device 13 and the first roadside device 12 through an on-board unit (OBU) and a roadside unit (RSU). A communication connection may also be established between the first roadside device 12 and the second roadside device 15 through the V2X technology.

As shown in FIG. 3A, the mobile terminal 14 may obtain terminal location data through a terminal positioning apparatus. Then, the mobile terminal 14 may report the terminal location data to the first roadside device 12 through a V2X network, and report the terminal location data to the cloud server 11 through a cellular network. The in-vehicle device 13 may obtain vehicle location data through a vehicle positioning apparatus, and obtain vehicle sensing data through an in-vehicle sensing apparatus. Then, the in-vehicle device 13 may report the vehicle location data and the vehicle sensing data to the first roadside device 12 through a V2X network, and report the vehicle location data and the vehicle sensing data to the cloud server 11 through a cellular network. The first roadside device 12 may obtain roadside sensing data via a roadside sensing apparatus, obtain the terminal location data via the mobile terminal 14, and obtain the vehicle location data and the vehicle sensing data via the in-vehicle device 13. The terminal location data, the vehicle location data, and the vehicle sensing data may be referred to as roadside-collected data of the first roadside device 12. Optionally, if the second roadside devices 15 include the third roadside device that establishes the communication connection to the first roadside device 12, the third roadside device may send roadside-collected data collected by the third roadside device to the first roadside device 12. In this case, the roadside-collected data of the first roadside device 12 further includes the roadside-collected data of the third roadside device. In this way, when a fault occurs in a communication connection between the third roadside device and the cloud server 11, the roadside-collected data of the third roadside device can still be reported to the cloud server. This improves reliability of the communication system. Subsequently, the first roadside device 12 may report the roadside sensing data and the roadside-collected data to the cloud server through a cellular network. Similarly, the second roadside device 15 may also report roadside sensing data and roadside-collected data to the cloud server through a cellular network. For manners in which the second roadside device 15 obtains the roadside sensing data and the roadside-collected data, refer to manners in which the first roadside device 12 obtains the roadside sensing data and the roadside-collected data. Details are not described herein.

It can be learned that data received by the cloud server 11 includes the roadside sensing data from the first roadside device 12, the roadside-collected data from the first roadside device 12, the roadside sensing data from the second roadside device 15, the roadside-collected data from the second roadside device 15, the vehicle location data and the vehicle sensing data from the in-vehicle device 13, and the terminal location data from the mobile terminal 14.

Then, the cloud server 11 may obtain a roadside sensing result based on the roadside sensing data from the first roadside device 12, and obtain, based on the foregoing received data, a multi-source fusion sensing result corresponding to the first roadside device. In an example, the cloud server 11 may screen out, from the roadside sensing data from the first roadside device 12, roadside sensing data that is in a preset time period, to obtain a roadside sensing result of the first roadside device, and screen out, from the received data, data that is in the preset time period and in a preselected range, and fuse the data that is screened out, to obtain the multi-source fusion sensing result of the first roadside device. The preselected range is a region around the first roadside device. The preselected range may be determined based on a factory indicator of the sensing range of the first roadside device and an installation direction of the first roadside device. For example, a specific margin (such as 3 meters or 5 meters) may be reserved in the installation direction based on the factory indicator of the sensing range of the first roadside device, to obtain the preselected range. The data that is in the preset time period and in the preselected range is screened out for fusion, which can reduce an amount of data to be fused and matched. Therefore, an operation amount is reduced, and efficiency is improved. It may be understood that in a process of obtaining the multi-source fusion sensing result, the obtained multi-source fusion sensing result is more accurate if there are more roadside sensing devices, there are more traffic participants, or the preset time period is longer.

After obtaining the roadside sensing result and the multi-source fusion sensing result, the cloud server 11 may match the roadside sensing result with the multi-source fusion sensing result, to obtain matching results of a plurality of target location points, and generate first sensing capability information of the first roadside device based on the matching results. Then, as shown in FIG. 3A, the cloud server 11 may deliver the first sensing capability information to the first roadside device 12, the in-vehicle device 13, the mobile terminal 14, the second roadside device 15, and the like. After receiving the first sensing capability information, the first roadside device 12 may forward the first sensing capability information to the in-vehicle device 13, the mobile terminal 14, and the third roadside device in the second roadside devices 15. For a process of matching the roadside sensing result with the multi-source fusion sensing result to obtain matching results of a plurality of target location points, and a process of generating the first sensing capability information of the first roadside device based on the matching results, refer to detailed descriptions in subsequent parts of this embodiment of this application.

Figure 3B:
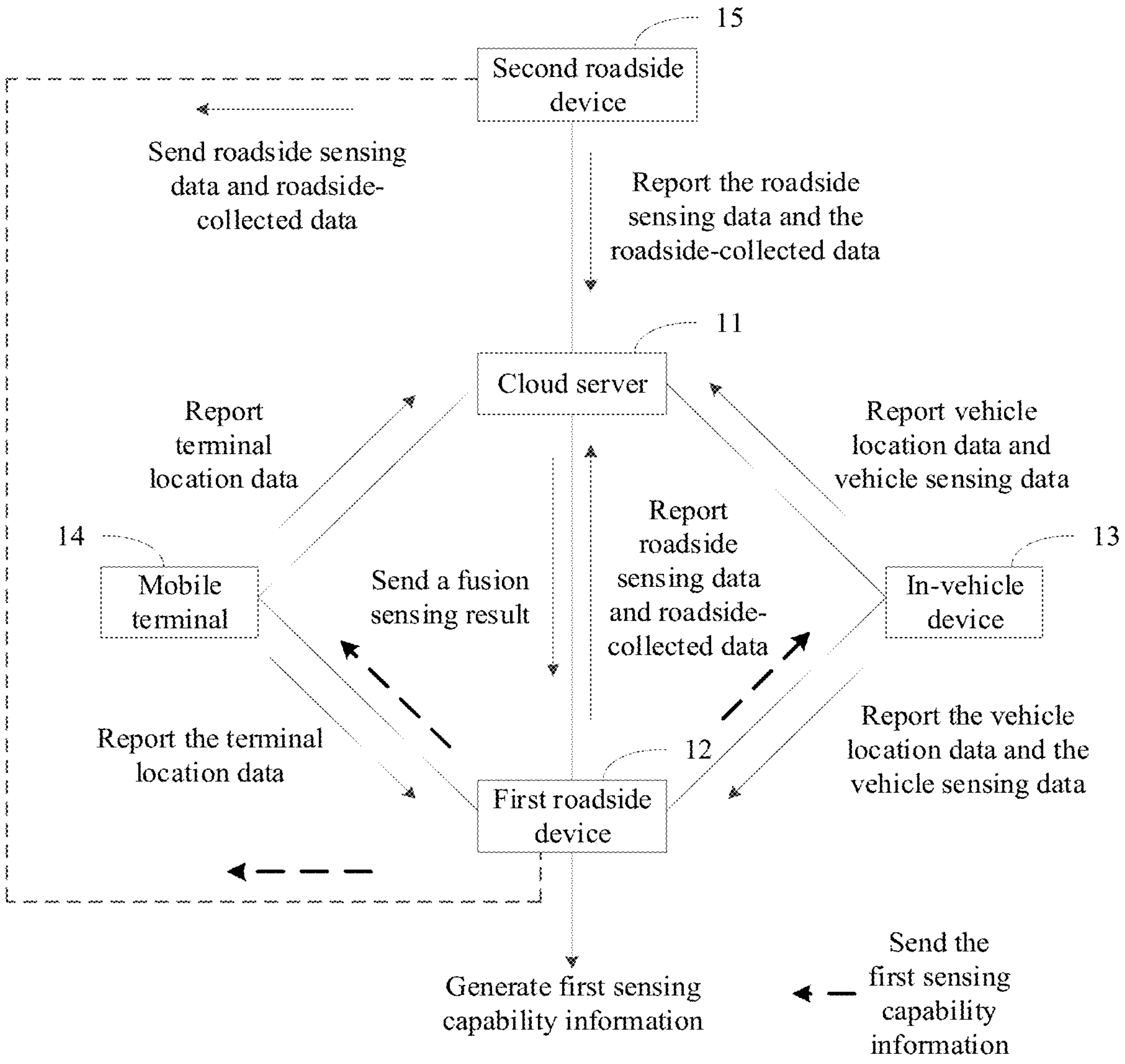
FIG. 3B is a schematic diagram depicting a structure of a communication system according to an embodiment of this application.

FIG. 3B is a schematic diagram depicting a structure of a communication system according to an embodiment of this application. For devices included in the communication system shown in FIG. 3B and connection relationships among the devices, refer to the communication system shown in FIG. 3A. Details are not described herein. For a process of receiving data by a cloud server 11 in FIG. 3B, refer to a process of receiving data by the cloud server 11 in FIG. 3A. Details are not described herein.

In FIG. 3B, the data received by the cloud server 11 includes roadside sensing data from a first roadside device 12, roadside-collected data from the first roadside device 12, roadside sensing data from a second roadside device 15, roadside-collected data from the second roadside device 15, vehicle location data and vehicle sensing data from an in-vehicle device 13, and terminal location data from a mobile terminal 14. The cloud server 11 may obtain, based on the foregoing received data, a multi-source fusion sensing result corresponding to the first roadside device. Then, the cloud server 11 may send, to the first roadside device 12, the multi-source fusion sensing result corresponding to the first roadside device. The first roadside device 12 may obtain a roadside sensing result based on roadside sensing data of the first roadside device 12.

After obtaining the roadside sensing result and the multi-source fusion sensing result, the first roadside device 12 may match the roadside sensing result with the multi-source fusion sensing result, to obtain matching results of a plurality of target location points, and generate first sensing capability information of the first roadside device based on the matching results. Then, as shown in FIG. 3B, the first roadside device 12 may send the first sensing capability information to the in-vehicle device 13, the mobile terminal 14, and a third roadside device in second roadside devices 15. For a process of matching the roadside sensing result with the multi-source fusion sensing result to obtain matching results of a plurality of target location points, and a process of generating the first sensing capability information of the first roadside device based on the matching results, refer to detailed descriptions in subsequent parts of this embodiment of this application.

Figure 3C:
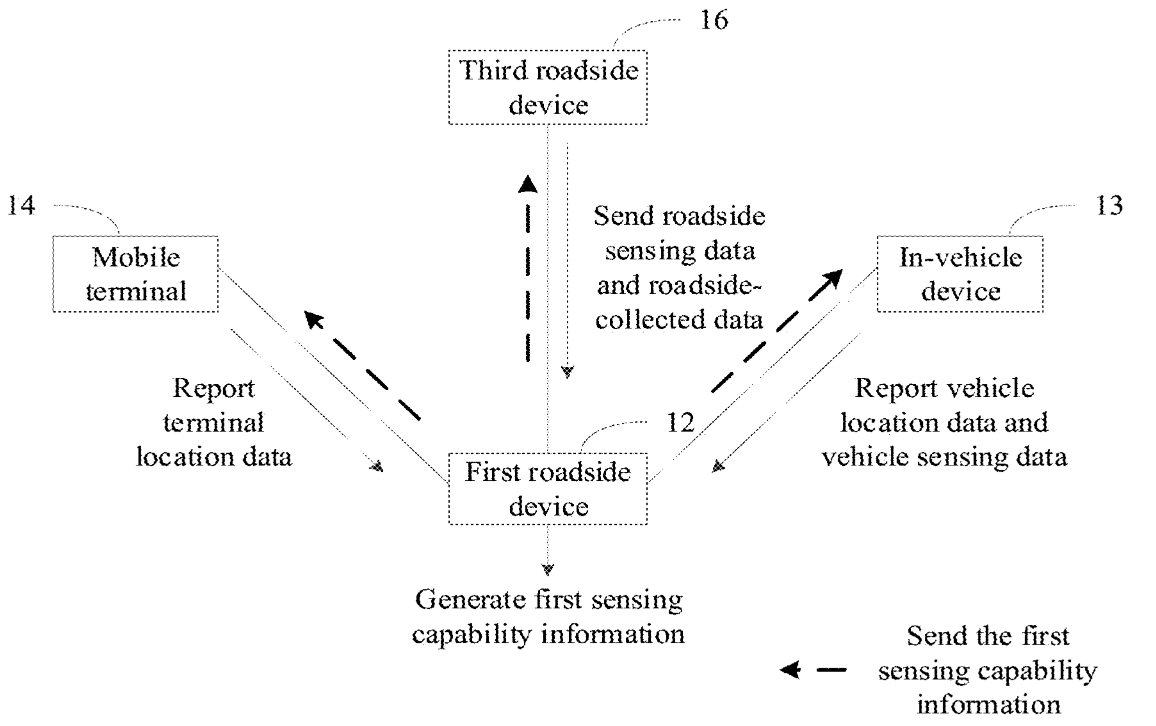
FIG. 3C is a schematic diagram depicting a structure of a communication system according to an embodiment of this application.

FIG. 3C is a schematic diagram depicting a structure of a communication system according to an embodiment of this application. As shown in FIG. 3C, the communication system may include a first roadside device 12, an in-vehicle device 13, a mobile terminal 14, and a third roadside device 16. The in-vehicle device 13, the mobile terminal 14, and the third roadside device 16 each establish a communication connection to the first roadside device 12.

As shown in FIG. 3C, the in-vehicle device 13 reports vehicle location data and vehicle sensing data to the first roadside device 12, the mobile terminal 14 reports terminal location data to the first roadside device 12, and the third roadside device 16 sends roadside sensing data and roadside-collected data of the third roadside device to the first roadside device 12. At this point, data obtained by the first roadside device 12 includes the vehicle location data and the vehicle sensing data from the in-vehicle device 13, the terminal location data from the mobile terminal 14, the roadside sensing data and the roadside-collected data from the third roadside device 16, and roadside sensing data of the first roadside device 12. Subsequently, the first roadside device 12 may obtain a roadside sensing result based on the roadside sensing data of the first roadside device 12, and obtain a multi-source fusion sensing result based on the foregoing obtained data. For manners in which the first roadside device 12 obtains the roadside sensing result and the multi-source fusion sensing result, refer to manners in which the cloud server 11 obtains the roadside sensing result and the multi-source fusion sensing result in FIG. 3A. Details are not described herein.

After obtaining the roadside sensing result and the multi-source fusion sensing result, the first roadside device 12 may match the roadside sensing result with the multi-source fusion sensing result, to obtain matching results of a plurality of target location points, and generate first sensing capability information of the first roadside device based on the matching results. Then, as shown in FIG. 3B, the first roadside device 12 may send the first sensing capability information to the in-vehicle device 13, the mobile terminal 14, and the third roadside device in second roadside devices 15. For a process of matching the roadside sensing result with the multi-source fusion sensing result to obtain matching results of a plurality of target location points, and a process of generating the first sensing capability information of the first roadside device based on the matching results, refer to detailed descriptions in subsequent parts of this embodiment of this application.

The first roadside device may sense one or more traffic participants in the preset time period. Each sensed traffic participant corresponds to a group of location points, which are referred to as a first group of location points. In other words, the roadside sensing result may indicate a first group of location points of each traffic participant in the one or more traffic participants sensed by the first roadside device in the preset time period. Further, the roadside sensing result may include at least one of time information, location information, a motion parameter, and attribute information of each location point in the first group of location points indicated by the roadside sensing result.

In the preset time period, location change information of a same traffic participant may be obtained by a plurality of sensing devices. For example, in the preset time period, location change information of a vehicle 1 may be obtained by an in-vehicle device of the vehicle 1, sensed by a surrounding roadside device, and sensed by an in-vehicle device of a surrounding vehicle. Each sensing device that obtains location change information of a traffic participant in the preset time period may obtain a group of location points of the traffic participant. After groups of location points obtained by all sensing devices that sense the location change information of the traffic participant are fused, a group of location points corresponding to the traffic participant may be obtained, which is referred to as the second group of location points. For example, in this embodiment of this application, data obtained by a plurality of sensing devices may be fused through Kalman filtering, multi-Bayesian estimation, fuzzy logic inference, an artificial neural network, or the like.

It can be learned that the first group of location points of a traffic participant are a group of location points sensed by the first roadside device, and the second group of location points of a traffic participant are a group of location points obtained by fusing a plurality of groups of location points obtained by a plurality of sensing devices.

In a possible implementation, location points (including the first group of location points and the second group of location points) indicated by the roadside sensing result and the multi-source fusion sensing result are discrete location points. The roadside sensing result includes at least one of time information, location information, a motion parameter, and attribute information of each location point in the first group of location points. The multi-source fusion sensing result includes at least one of time information, location information, a motion parameter, and attribute information of each location point in the second group of location points. That the roadside sensing result is matched with the multi-source fusion sensing result includes performing point-by-point matching on the first group of location points and the second group of location points. Herein, point-by-point matching is performed regardless of a time sequence relationship. This reduces difficulty in obtaining the roadside sensing result and the multi-source fusion sensing result.

Figure 4A:
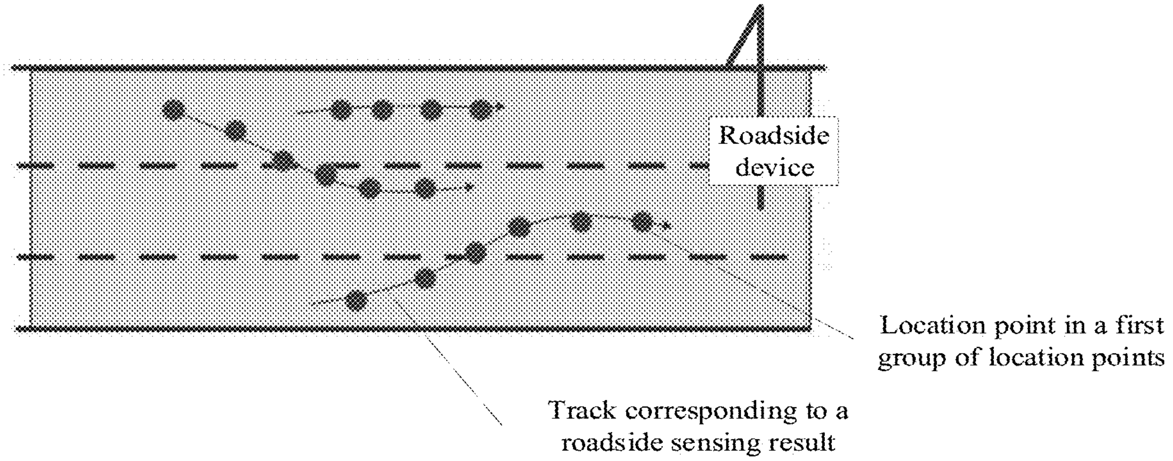
FIG. 4A is a schematic diagram depicting a first group of location points and a corresponding track according to an embodiment of this application.
Figure 4B:
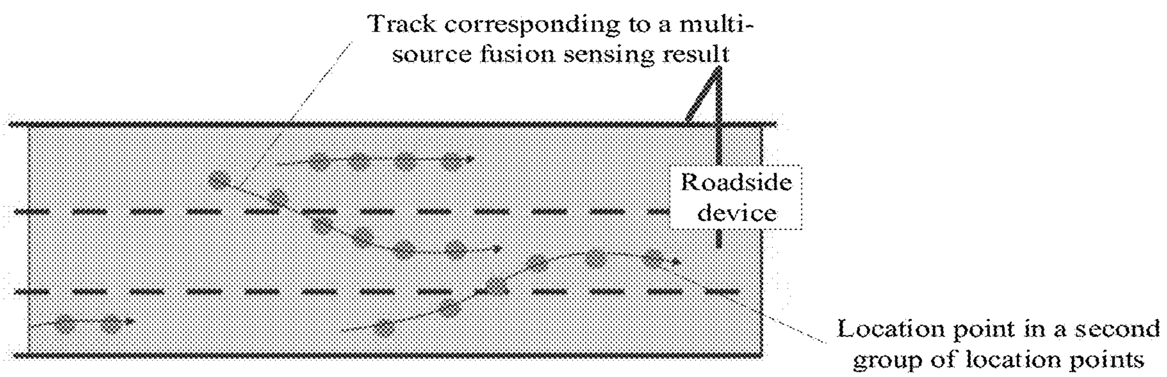
FIG. 4B is a schematic diagram depicting a second group of location points and a corresponding track according to an embodiment of this application.

In a possible implementation, location points (including the first group of location points and the second group of location points) indicated by the roadside sensing result and the multi-source fusion sensing result are location points on tracks. FIG. 4A is a schematic diagram depicting a first group of location points and a corresponding track according to an embodiment of this application. FIG. 4B is a schematic diagram depicting a second group of location points and a corresponding track according to an embodiment of this application. The roadside sensing result includes time sequence relationships among location points in the first group of location points and at least one of time information, location information, a motion parameter, and attribute information of each location point in the first group of location points. The multi-source fusion sensing result includes time sequence relationships among location points in the second group of location points and at least one of time information, location information, a motion parameter, and attribute information of each location point in the second group of location points. That the roadside sensing result is matched with the multi-source fusion sensing result includes performing track matching on the roadside sensing result and the multi-source fusion sensing result. For example, an algorithm for track matching may include but is not limited to a Hungarian algorithm, a K-means algorithm, or the like. In this embodiment of this application, an algorithm used during track matching is not limited. Herein, track matching is performed in combination with a time sequence relationship. This can improve accuracy and confidence of a matching result.

After the roadside sensing result is matched with the multi-source fusion sensing result, matching results of a plurality of target location points may be obtained. Herein, a target location point is a location point in the first group of location points or a location point in the second group of location points. A matching result of the target location point is true positive (TP), false negative (FN), or false positive (FP).

A matching result of TP for the target location point indicates that the target location point is a location point in the second group of location points, and there is a location point that is in the first group of location points and that matches the target location point. A matching result of FN for the target location point indicates that the target location point is a location point in the second group of location points, and there is no location point that is in the first group of location points and that matches the target location point. A matching result of FP for the target location point indicates that the target location point is a location point in the first group of location points, and there is no location point that is in the second group of location points and that matches the target location point.

Figure 4C:
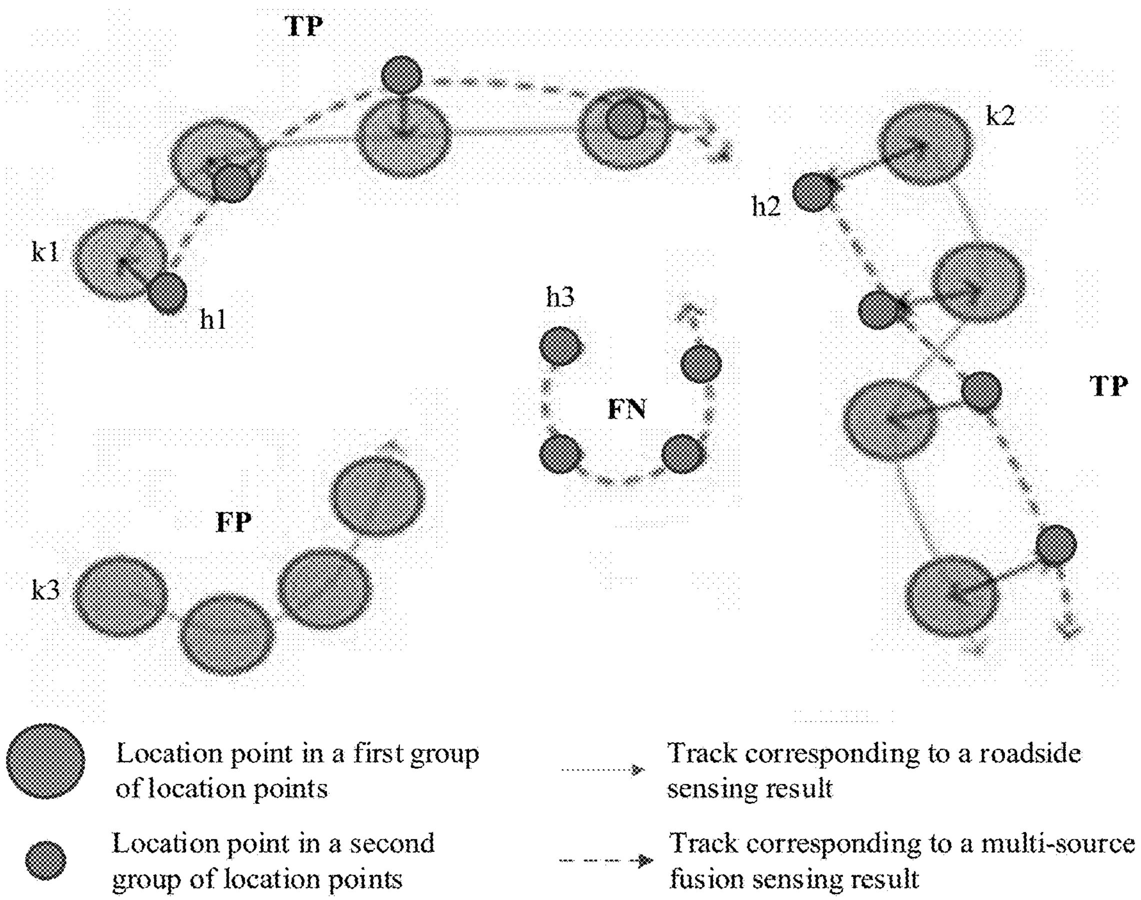
FIG. 4C is a schematic diagram of matching results according to an embodiment of this application.

FIG. 4C is a schematic diagram of matching results according to an embodiment of this application. As shown in FIG. 4C, k1, k2, and k3 are tracks corresponding to a roadside sensing result, and location points on k1, k2, and k3 are location points in a first group of location points. h1, h2, and h3 are tracks corresponding to a multi-source fusion sensing result, and location points on h1, h2, and h3 are location points in a second group of location points. Through track matching, it is found that h1 matches k1, h2 matches k2, and there is no track matching h3 nor track matching k3. Location points on h1 and h2 belong to the second group of location points, and there are location points that are in the first group of location points and that match the location points on h1 and h2. Therefore, the location points on h1 and h2 are target location points whose matching results are TP. A location point on h3 belongs to the second group of location points, and there is no location point that is in the first group of location points and that matches the location point on h3. Therefore, the location point on h3 is a target location point whose matching result is FN. A location point on k3 belongs to the first group of location points, and there is no location point that is in the second group of location points and that matches the location point on k3. Therefore, the location point on k3 is a target location point whose matching result is FP.

Figure 4D:
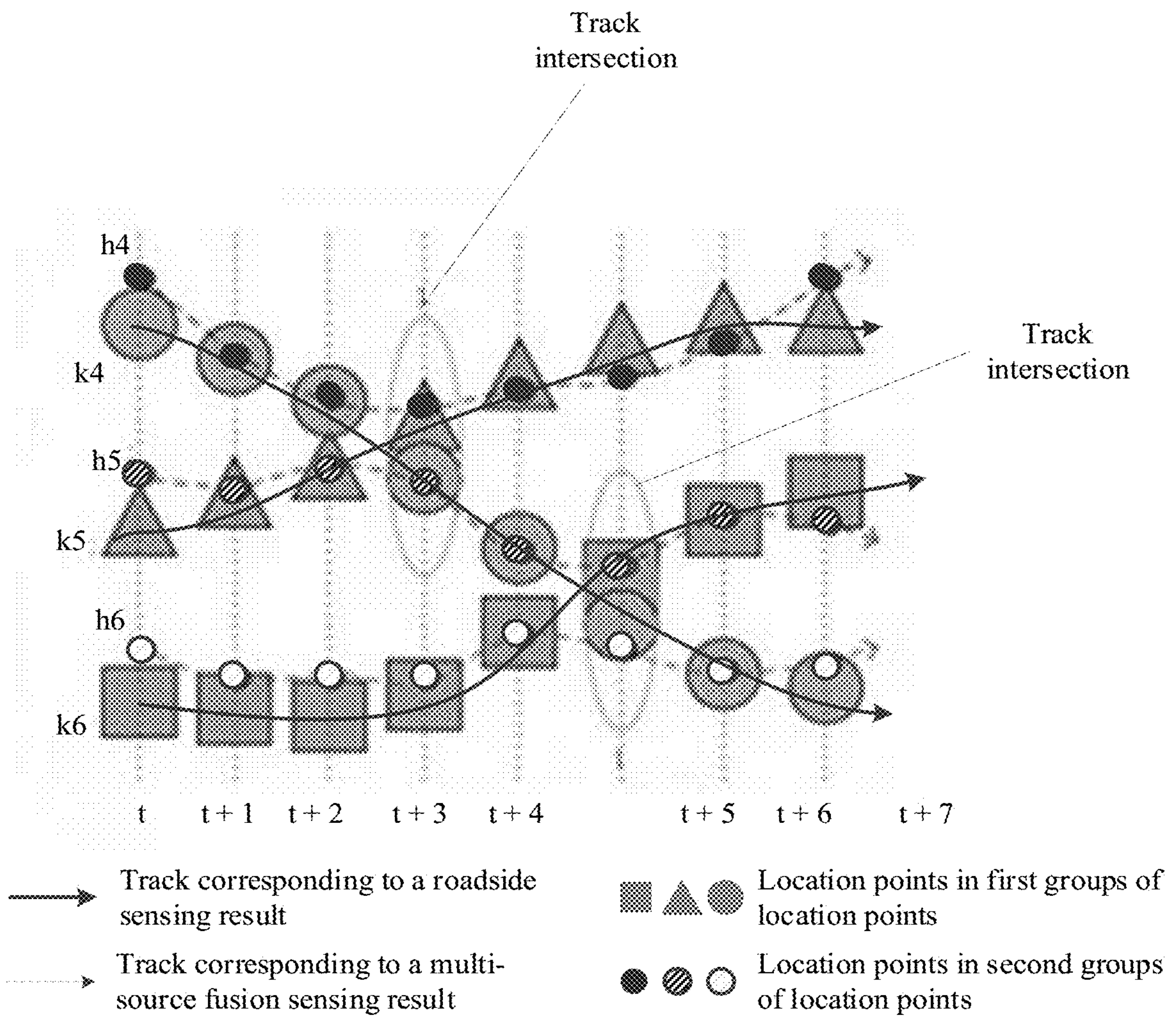
FIG. 4D is a schematic diagram of track matching according to an embodiment of this application.

FIG. 4D is a schematic diagram of track matching according to an embodiment of this application. As shown in FIG. 4D, k4, k5, and k6 are tracks corresponding to a roadside sensing result, and location points on k4, k5, and k6 are location points in first groups of location points. h4, h5, and h6 are tracks corresponding to a multi-source fusion sensing result, and location points on h4, h5, and h6 are location points in second groups of location points. Tracks of different traffic participants may intersect. As shown in FIG. 4D, k4 and k5 intersect, and k4 and k6 intersect. If it is mistakenly determined that a segment, in a time period from t to t+3, of k4 and a segment, in a time period from t+3 to t+7, of k5 form a track, the track that combines k4 and k5 is matched with h4. Consequently, a location point on h4 is mistakenly determined as a target location point whose matching result is TP. If it is mistakenly determined that a segment, in a time period from t+5 to t+7, of k4 and a segment, in a time period from t to t+5, of K6 form a track, the track that combines k4 and k6 is matched with h6. Consequently, a location point on h6 is mistakenly determined as a target location point whose matching result is TP. In this embodiment of this application, the roadside sensing result and the multi-source fusion sensing result include attribute information such as a geometric size or a color. In this way, when tracks of different traffic participants intersect, a possibility of mistakenly determining a track can be reduced, and accuracy and confidence of a target location point is improved.

In a possible implementation, a target location point whose matching result is TP may be associated with indicator information, to indicate a status of the target location point. In an example, the indicator information may include one or more of a motion indicator error, a size error, target tracking stability, and a location-point matching rate. The motion indicator error includes a location error and/or a speed error. For example, the location error may be dx/dy. dx indicates a difference, in a horizontal direction or in longitude, between the target location point and a first location point that matches the target location point. dy indicates a difference, in a vertical direction or in latitude, between the target location point and the first location point that matches the target location point. The speed error may be one or more of a speed difference, a speed ratio, an acceleration difference, and an acceleration ratio. The size error may be a size difference or a size ratio. The target tracking stability indicates a deviation between an estimated location point and a collected location point, and may reflect reliability of a group of location points. Higher target tracking stability indicates higher reliability of the group of location points. Lower target tracking stability indicates lower reliability of the group of location points. In a process of determining the target tracking stability, a location point can be estimated by using a method such as Kalman filtering, a hidden Markov model, or mean shift. The location-point matching rate indicates a ratio of a quantity of location points whose matching results are TP in the second group of location points to a total quantity of location points in the second group of location points. It may be understood that, tracking stability associated with target location points in a same second group of location points is the same, and location-point matching rates associated with the target location points are also the same. It may be understood that, the foregoing indicator information is merely an example for description, and the target location point whose matching result is TP may be further associated with other indicator information.

At this point, the plurality of target location points and a matching result of each target location point are obtained. The following describes a process of generating the first sensing capability information of the first roadside device based on the matching results.

In a possible implementation, that the first sensing capability information of the first roadside device is generated based on the matching results may include determining a plurality of grids based on a preselected range of the first roadside device, merging grids whose grid indicators meet a first condition in the plurality of grids to obtain a merged grid, and continuing to merge grids whose grid indicators meet the first condition in existing grids until no grid that meets the first condition exists, determining any grid as a sensing region, and determining a sensing capability level of the grid based on an indicator range to which a grid indicator of the grid belongs, and determining the sensing capability information of the first roadside device based on location information and a sensing capability level of each grid.

The preselected range of the first roadside device may be a region around the first roadside device. The preselected range of the first roadside device may be determined based on a factory indicator of a sensing range of the first roadside device and an installation direction of the first roadside device. For example, the sensing range shown in FIG. 1 may be used as the preselected range of the first roadside device. In an example, the preselected range of the first roadside device is greater than a range indicated in the installation direction by the factory indicator of the sensing range of the first roadside device.

In a possible implementation, that the plurality of grids is determined based on the preselected range of the first roadside device may include performing grid processing on the preselected range of the first roadside device to obtain the plurality of grids.

In another possible implementation, that the plurality of grids is determined based on the preselected range of the first roadside device may include obtaining an intersection of the preselected range of the first roadside device and a first road to obtain a to-be-divided region, and performing grid processing on the to-be-divided region to obtain the plurality of grids. The first road may be a road on which the first roadside device is located or a road sensed by the first roadside device. An association relationship between the first road and the first roadside device may be preset when the first roadside device is deployed.

Figure 5A:
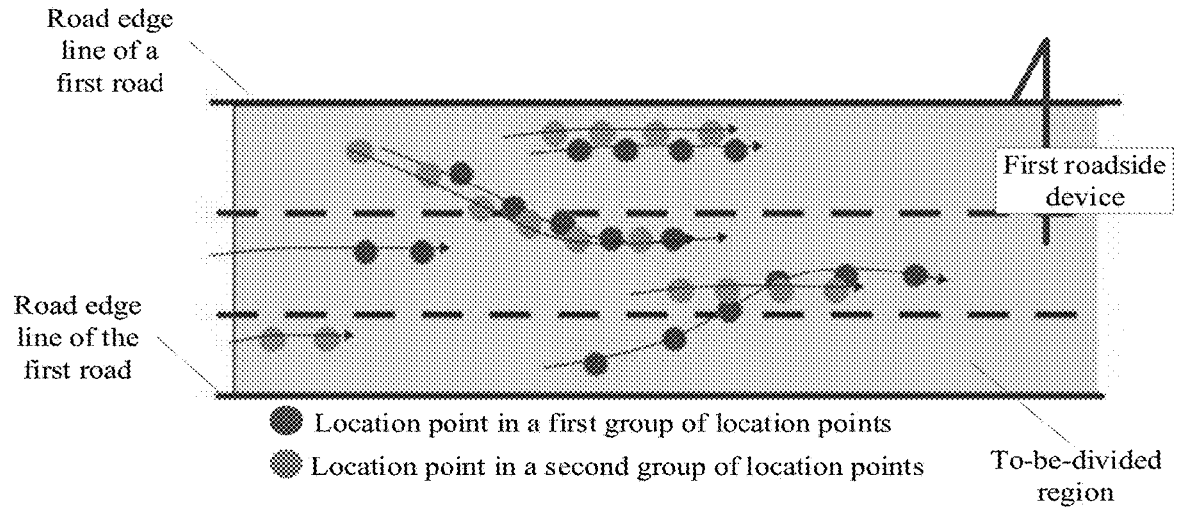
FIG. 5A is a schematic diagram of an example to-be-divided region according to an embodiment of this application.
Figure 5B:
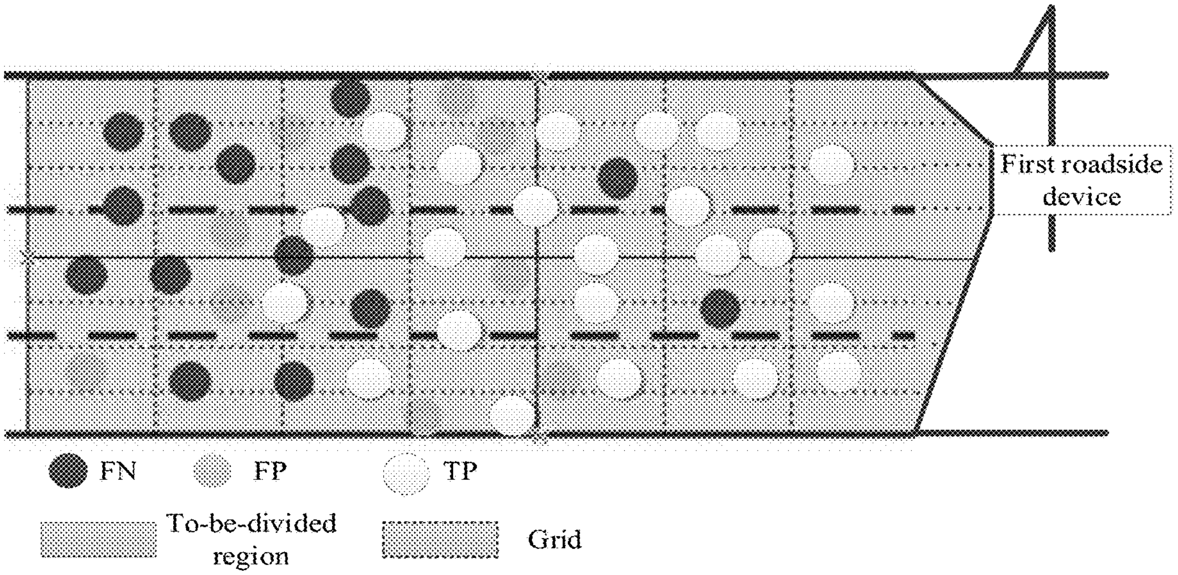
FIG. 5B is a schematic diagram of example grids according to an embodiment of this application.

FIG. 5A is a schematic diagram of an example to-be-divided region according to an embodiment of this application. As shown in FIG. 5A, the to-be-divided region does not exceed road edge lines of the first road. In this way, a quantity of sensed traffic participants is not reduced. In addition, this facilitates subsequent grid division and merging. FIG. 5B is a schematic diagram of example grids according to an embodiment of this application. As shown in FIG. 5B, the to-be-divided region may be divided into a plurality of grids. In an example, the to-be-divided region is evenly divided into a plurality of grids, to facilitate statistical management. Certainly, the to-be-divided region may alternatively be divided into a plurality of grids in another manner. For example, an area of a grid obtained by dividing a region closer to the first roadside device is smaller than an area of a grid obtained by dividing a region far away from the first roadside device.

After the grid division is completed, a grid indicator of each grid may be determined. In an example, a grid indicator of any grid may be determined based on indicator information of a target location point in the grid. In an example, the grid indicator includes one or more of a detection indicator, a motion indicator, and a tracking indicator. The detection indicator includes accuracy and/or a recall rate, the motion indicator includes a speed and/or an acceleration, and the tracking indicator includes a location-point matching rate and/or target tracking stability.

After the grid indicator of each grid is determined, grids whose grid indicators meet the first condition in the plurality of grids may be merged, to obtain a merged grid. The first condition includes one or more of the following conditions: a difference between detection indicators is less than a first threshold, a difference between motion indicators is less than a second threshold, and a difference between tracking indicators is less than a third threshold. The first threshold, the second threshold, and the third threshold may be set based on a requirement. For example, the first threshold may be set to 90%, the second threshold may be set to 1 meter per second (m/s), and the third threshold may be set to 95%. The first threshold, the second threshold, and the third threshold are not limited in this embodiment of this application.

Figure 5C:
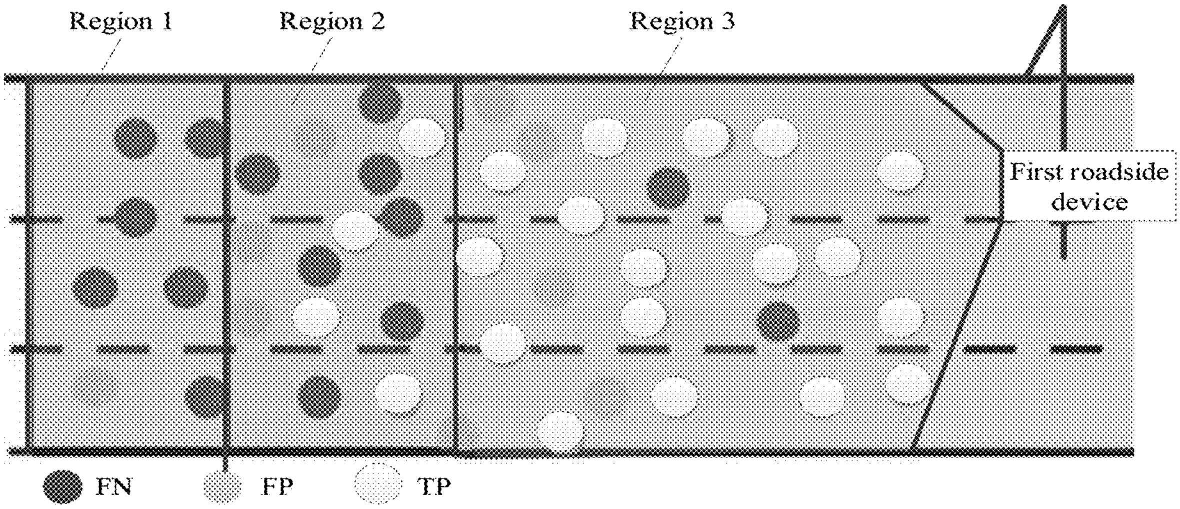
FIG. 5C is a diagram of a grid merging result according to an embodiment of this application.

Then, a grid indicator of each grid that is obtained after a previous round of merging is performed is determined, and grids whose grid indicators meet the first condition in existing grids continue to be merged, until no grid that meets the first condition exists. FIG. 5C is a diagram of a grid merging result according to an embodiment of this application. As shown in FIG. 5C, grids obtained through division are merged to obtain three regions: a region 1, a region 2, and a region 3. Refer to FIG. 5C. In the region 1, a proportion of target location points whose matching results are FN is large, a proportion of target location points whose matching results are FP is small, and a proportion of target location points whose matching results are TP is extremely small (even small to 0). It can be learned that the first roadside device cannot sense a traffic participant in the region 1, and the first roadside device has no sensing capability in the region 1. In the region 2, a proportion of target location points whose matching results are TP is small, and a proportion of location points whose matching results are FN and FP is large. It can be learned that the first roadside device can sense some traffic participants in the region 1, and the first roadside device has a sensing capability in the region 1. However, the sensing capability is weak. In the region 3, a proportion of target location points whose matching results are TP is large, and a proportion of target location points whose matching results are FN and FP is small. It can be learned that the first roadside device has a sensing capability in the region 3, and the sensing capability is strong.

If there is no grid that meets the first condition, that is, grid merging cannot continue, any grid is determined as a sensing region, and a sensing capability level of the sensing region is determined based on an indicator range to which a grid indicator of the sensing region belongs. Then, the sensing capability information of the first roadside device is determined based on location information and a sensing capability level of each sensing region.

In this embodiment of this application, each indicator range corresponds to a sensing capability level, and that a sensing capability level of the sensing region is determined based on an indicator range to which a grid indicator of the sensing region belongs includes determining the sensing capability level of the sensing region as a first sensing capability level when the grid indicator of the sensing region belongs to a first indicator range. The first indicator range is any one of indicator ranges, and the first sensing capability level is a sensing capability level corresponding to the first indicator range. FIG. 5C is used as an example. It is assumed that there are three sensing regions: a region 1, a region 2, and a region 3. A grid indicator of the region 1 belongs to an indicator range 1, a grid indicator of the region 2 belongs to an indicator range 2, and an indicator of the region 3 belongs to an indicator range 3. In this case, a sensing capability level of the first roadside device in the region 1 may be a level 1, a sensing capability level of the first roadside device in the region 2 may be a level 2, and a sensing capability level of the first roadside device in the region 3 may be a level 3.

In an example, that the grid indicator of the sensing region belongs to a first indicator range may be: the detection indicator is within a first range, and/or the motion indicator is within a second range, and/or the tracking indicator is within a third range. The first range, the second range, and the third range may be set based on a requirement. This is not limited in this embodiment of this application.

In an example, sensing capability levels may indicate a coverage hole, a weak sensing capability, an ordinary sensing capability, and a strong sensing capability. In another example, sensing capability levels may include a low level, an intermediate level, and a high level. In still another example, sensing capability levels may include a level 1, a level 2, a level 3, a level 4, and the like. It may be understood that the foregoing sensing capability levels are merely examples for description, and a manner of dividing sensing capability levels and a quantity of sensing capability levels obtained through division are not limited in this embodiment of this application.

In a possible implementation, the first sensing capability information may indicate a sensing capability of the first roadside device. For example, the first sensing capability information may indicate a region that can be sensed by the first roadside device and a region that cannot be sensed by the first roadside device. For example, the first roadside device can sense a region within 200 meters, but cannot sense a region beyond 200 meters.

In a possible implementation, the first sensing capability information may indicate a first region and a sensing capability of the first roadside device in the first region.

The first region may be any region. In an example, the first region may be a region on the first road. The first region may be a rectangle, a sector, a polygon, or the like. A shape and an area of the first region are not limited in this embodiment of this application. For example, sensing performance of the first roadside device in a region within 100 meters is good, that is, a sensing capability is strong. Sensing performance of the first roadside device in a region from 100 meters to 150 meters is ordinary, that is, a sensing capability is intermediate. Sensing performance of the first roadside device in a region from 150 meters to 200 meters is poor, that is, a sensing capability is weak. A region beyond 200 meters cannot be sensed, that is, no sensing capability exists.

In a possible implementation, the first sensing capability information may indicate a first scenario, a first region, and a sensing capability of the first roadside device in the first scenario in the first region.

The "scenario" in this embodiment of the present application is used to identify an environment in which a device having a sensing function works, or identify an environment in which a target sensed by the device having the sensing function is located. The first scenario may be any scenario. For example, the first scenario includes but is not limited to a scenario that affects the sensing capability, such as daytime, night, sunny weather, cloudy weather, windy/sandy weather, rainy/snowy weather, or foggy weather. It may be understood that a sensing range of the first roadside device in the daytime is wider than a sensing range at night, and a sensing range in the sunny weather is wider than a sensing range in the cloudy weather, the windy/sandy weather, the rainy/snowy weather, or the foggy weather. The sensing range of the first roadside device varies with intensity of sand/wind, intensity of rain/snow, or a fog level. Therefore, in this embodiment of this application, the sensing capability of the first roadside device may be described by scenario, so that the sensing capability of the first roadside device is more accurate. For example, in a sunny weather scenario, the first roadside device has an intermediate sensing capability in the region 2 shown in FIG. 5C, and a strong sensing capability in the region 3 shown in FIG. 5C. In a foggy weather scenario, the first roadside device has a weak sensing capability in the region 2 shown in FIG. 5C, and an intermediate sensing capability in the region 3 shown in FIG. 5C.

It should be noted that when the first sensing capability information indicates the first scenario, the first region, and the sensing capability of the first roadside device in the first scenario in the first region, a scenario label may be added to the foregoing roadside sensing data, vehicle sensing data, vehicle location data, and terminal location data. In this way, a roadside sensing result in the first scenario and a multi-source fusion sensing result in the first scenario can be obtained. It is assumed that no scenario label is added to the foregoing roadside sensing data, vehicle sensing data, vehicle location data, and terminal location data. In this case, before the roadside sensing result in the first scenario and the multi-source fusion sensing result in the first scenario are obtained, roadside sensing data in the first scenario, vehicle sensing data in the first scenario, vehicle location data in the first scenario, and terminal location data in the first scenario may be obtained with reference to third-party information (such as time information and historical weather information).

At this point, the first sensing capability information of the first roadside device is obtained. In this embodiment of this application, for second sensing capability information of any second roadside device, refer to the first sensing capability information of the first roadside device. For a manner of obtaining the second sensing capability information of the second roadside device, refer to a manner of obtaining the sensing capability information of the first roadside device. Details are not described herein.

In a possible implementation, the first sensing capability information of the first roadside device may be associated with a road identifier. In this way, during route planning or before a traffic participant plans to enter a road or a road segment, sensing capability information of each roadside device on the road or the road segment may be invoked, to determine roadside sensing performance of each region on the road or the road segment. This helps improve safety.

The following describes application of sensing capability information.

Due to a reason such as blocking on a road, a coverage hole may exist even though there are a plurality of roadside devices. In this embodiment of this application, sensing capability information of all roadside devices may be combined to form an overall sensing coverage capability. In a possible implementation, the method further includes generating a plurality of pieces of sensing capability information for a plurality of roadside devices, and generating sensing coverage hole information based on the plurality of pieces of sensing capability information.

The plurality of pieces of sensing capability information indicate sensing capabilities of the plurality of roadside devices. Further, the plurality of roadside devices includes the first roadside device. In this case, the plurality of pieces of sensing capability information include the first sensing capability information. In addition, the plurality of roadside devices may further include one or more second roadside devices. In this case, the plurality of pieces of sensing capability information include one or more pieces of second sensing capability information.

The sensing coverage hole information indicates a region out of coverage of one or more roadside devices in the plurality of roadside devices. In an example, the region out of coverage of one or more roadside devices in the plurality of roadside devices includes an absolute coverage hole and/or a relative coverage hole. A sensing capability of each of the plurality of roadside devices cannot meet a sensing capability criterion in the absolute coverage hole, and sensing capabilities of some of the plurality of roadside devices cannot meet the sensing capability criterion in the relative coverage hole.

Figure 6:
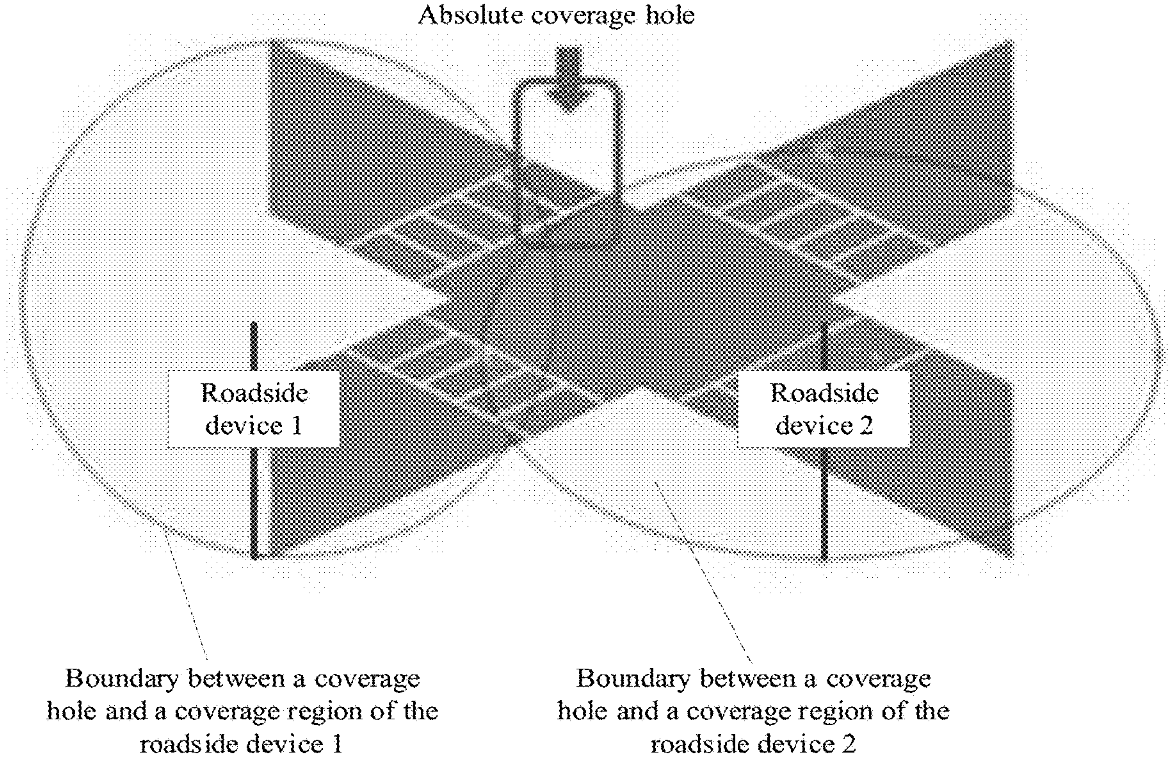
FIG. 6 is a schematic diagram of an example coverage hole according to an embodiment of this application.

The sensing capability criterion may be set based on a requirement, and is not limited in this application. In an example, meeting the sensing capability criterion includes but is not limited to meeting a preset sensing capability level (for example, a corresponding sensing capability level is a level 1 or a level 2), or falling within a preset indicator range (for example, a detection indicator falls within the preset indicator range, and/or a motion indicator falls within the preset indicator range, and/or a tracking indicator falls within the preset indicator range), or the like. When the roadside device cannot meet the sensing capability criterion in a region, it indicates that sensing performance of the roadside device in the region is poor, and confidence of information sensed in the region is low. Therefore, the region is a coverage hole of the roadside device. FIG. 6 is a schematic diagram of an example coverage hole according to an embodiment of this application. FIG. 6 shows a boundary between a coverage hole and a coverage region of a roadside device 1 and a boundary between a coverage hole and a coverage region of a roadside device 2. A region within the boundary is a coverage region, and a region outside the boundary is a coverage hole. An intersection of a coverage hole of the roadside device 1 and a coverage region of the roadside device 2 and an intersection of a coverage region of the roadside device 1 and a coverage hole of the roadside device 2 are relative coverage holes. An intersection of the coverage hole of the roadside device 1 and the coverage hole of the roadside device 2 is an absolute coverage hole.

For example, the roadside device 1 and the roadside device 2 shown in FIG. 6 are used to describe a process of determining a relative coverage hole and an absolute coverage hole.

If a communication connection is established between the roadside device 1 and the roadside device 2, a sensing capability of a region depends on a stronger one of sensing capabilities of the roadside device 1 and the roadside device 2. It may be determined that a region is the absolute coverage hole if neither a sensing capability of the roadside device 1 in the region nor a sensing capability of the roadside device 2 in the region meets the sensing capability criterion. In this case, the relative coverage hole may be not marked.

If no communication connection is established between the roadside device 1 and the roadside device 2, a region in which the sensing capability of the roadside device 1 does not meet the sensing capability criterion but the sensing capability of the roadside device 2 can meet the sensing capability criterion, and a region in which the sensing capability of the roadside device 2 does not meet the sensing capability criterion but the sensing capability of the roadside device 1 can meet the sensing capability criterion are determined as relative coverage holes. A region in which neither the sensing capability of the roadside device 1 nor the sensing capability of the roadside device 2 meets the sensing capability criterion is determined as the absolute coverage hole.

In an example, different identifiers may be added to the absolute coverage hole and the relative coverage hole. For example, a first identifier is added to the absolute coverage hole, and a second identifier is added to the relative coverage hole. In this way, whether a coverage hole is the absolute coverage hole or the relative coverage hole may be determined based on an identifier. Optionally, in a process of identifying the relative coverage hole, the relative coverage hole may be further associated with an identifier of a roadside device, to clarify a specific roadside device to which the relative coverage hole belongs.

In still another example, a connection may be established between sensing capability information of a roadside device and a roadside device to which the roadside device establishes a communication connection. In this way, a user may independently determine specific roadside devices to which the roadside device establishes communication connections, to determine the absolute coverage hole and the relative coverage hole.

In a possible implementation, the method further includes generating warning prompt information based on the first sensing capability information. The warning prompt information is used to prompt a driver to take over a vehicle in a second region, perform fault detection on the first roadside device, reduce confidence of information that is about the second region and that is sensed by the first roadside device, or bypass the second region during route planning.

The first sensing capability information indicates that a sensing capability of the first roadside device in the second region is lower than a sensing threshold. The sensing threshold may be set based on a requirement. In an example, being lower than the sensing threshold may include but is not limited to one or more of the following: a sensing capability level threshold is not reached (for example, a level-1 sensing capability level is not reached, or a level-2 sensing capability level is not reached), a detection indicator does not reach a preset detection indicator threshold, a motion indicator does not reach a preset motion indicator threshold, and a tracking indicator does not reach a preset tracking indicator threshold. The detection indicator threshold, the motion indicator threshold, and the tracking indicator threshold herein may be set based on a requirement. This is not limited in this embodiment of this application. The sensing capability criterion is used to determine a coverage hole, and the sensing threshold is used for warning. A warning is needed in a coverage region with poor sensing performance. Therefore, in an example, the sensing threshold may be greater (higher) than or equal to the sensing capability criterion.

The sensing capability of the first roadside device in the second region is lower than the sensing threshold. This indicates that sensing performance of the first roadside device in the second region is poor, and the first roadside device cannot accurately and comprehensively sense a traffic participant in the second region. Therefore, a risk of self-driving of a vehicle in the second region is high, and the driver can take over the vehicle in the second region. In addition, fault detection may be performed on the first roadside device to check whether poor sensing performance of the first roadside device in the second region is caused due to a fault in the first roadside device, especially when the second region is close to the first roadside device. Further, the sensing performance of the first roadside device in the second region is poor, and accuracy of the information that is about the second region and that is sensed by the first roadside device is low. Therefore, the confidence of the information that is about the second region and that is sensed by the first roadside device can be reduced. In an example, the information that is about the second region and that is sensed by the first roadside device includes a location point of a traffic participant in the second region and one or more of time information, location information, a motion parameter, attribute information, and the like of each location point. The sensing performance of the first roadside device in the second region is poor. Therefore, the second region may be bypassed during route planning. In this way, a possibility of an accident that occurs after the vehicle enters the second region can be reduced. In particular, a self-driving vehicle does not need to be taken over by a driver if the vehicle bypasses the second region. This effectively improves user experience.

Figure 7:
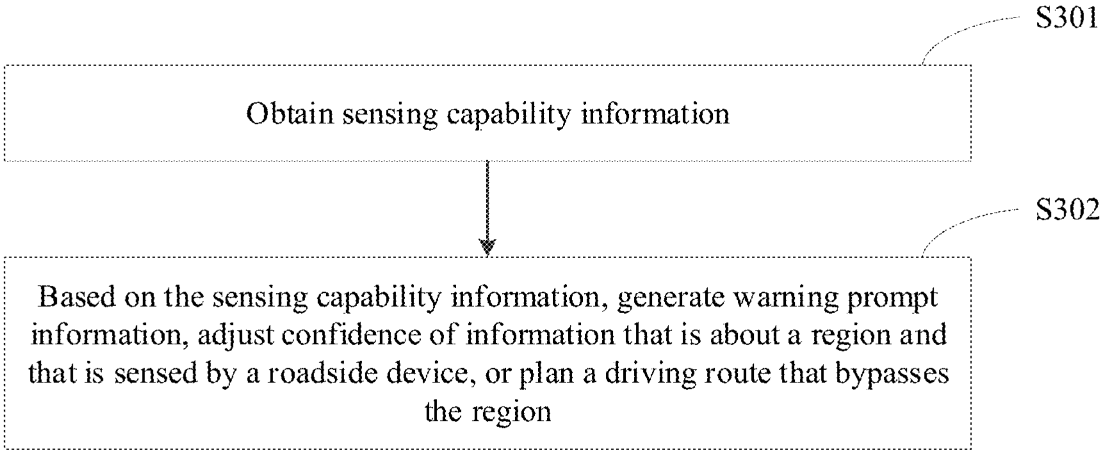
FIG. 7 is a schematic flowchart of a method for using sensing capability information according to an embodiment of this application.

In this embodiment of this application, sensing capability information of each roadside device may be further provided for another device to use, for example, may be provided to an in-vehicle device, a mobile terminal, or a management device of the roadside device. FIG. 7 is a schematic flowchart of a method for using sensing capability information according to an embodiment of this application. As shown in FIG. 7, the method for using sensing capability information may include the following steps.

Step S301: Obtain sensing capability information.

In this step, one or more pieces of sensing capability information from one or more roadside devices may be received. For example, first sensing capability information from a first roadside device may be received. For another example, the first sensing capability information from the first roadside device and one or more pieces of second sensing capability information from one or more second roadside devices may be received. For a process of generating the second sensing capability information, refer to a process of generating the first sensing capability information, and details are not described herein.

Any received piece of sensing capability information may indicate a region and a sensing capability of a roadside device in the region. For example, the first sensing capability information may indicate a first region and a sensing capability of the first roadside device in the first region. In a possible implementation, any received piece of sensing capability information indicates a region, a scenario, and a sensing capability of a roadside device in the scenario in the region. For example, the first sensing capability information may indicate a sensing capability of the first roadside device in the first scenario in the first region.

In a possible implementation, a region indicated by the sensing capability information includes an absolute coverage hole, and the absolute coverage hole is a region in which a sensing capability of each of a plurality of roadside devices cannot meet a sensing capability criterion. In a possible implementation, the region indicated by the sensing capability information includes a relative coverage hole, and the relative coverage hole is a region in which sensing capabilities of sensing capabilities of some of the plurality of roadside devices cannot meet the sensing capability criterion.

Step S302: Based on the sensing capability information, generate warning prompt information, adjust confidence of information that is about the region and that is sensed by the roadside device, or plan a driving route that bypasses the region.

In this step, a sensing capability of each roadside device for each region may be determined based on the received sensing capability information, to learn of a region in which a traffic participant can be accurately sensed by the roadside device and a region in which a traffic participant cannot be accurately sensed by the roadside device. Based on these sensing capabilities, the warning prompt information is generated, the confidence of the information that is about the region and that is sensed by the roadside device is adjusted, or the driving route that bypasses the region is planned.

In a possible implementation, the warning prompt information is used to prompt a driver to take over a vehicle in the region, avoid a vehicle in the region, perform fault detection on the roadside device, reduce the confidence of the information that is about the region and that is sensed by the roadside device, or bypass the region during route planning, where the sensing capability information indicates that the sensing capability of the roadside device in the region is lower than a sensing threshold.

It may be understood that different devices perform different actions based on the sensing capability information, and a same device may perform different actions based on the sensing capability information. The following describes step S302 with reference to FIG. 8A to FIG. 8C.

Figure 8A:
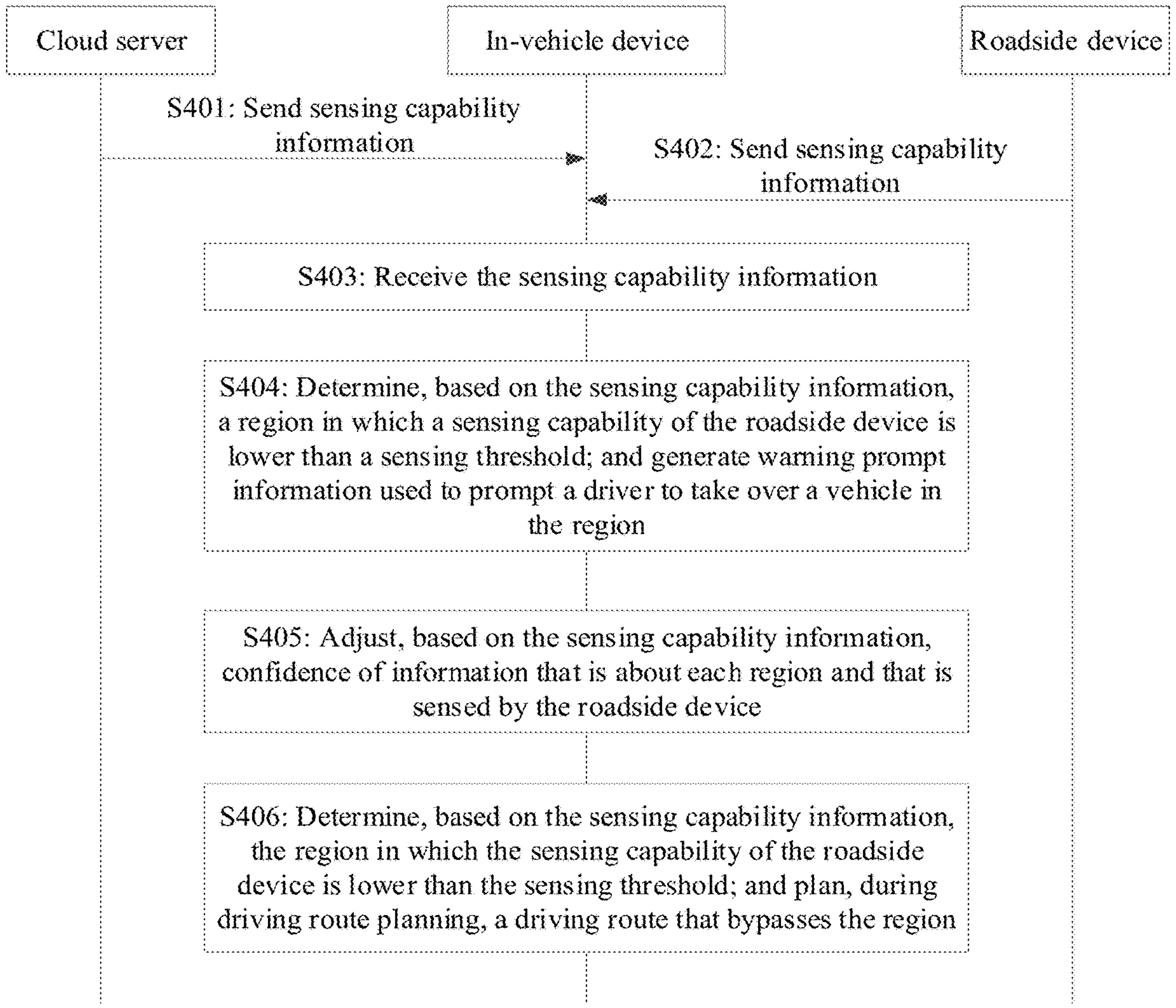
FIG. 8A is a schematic diagram of interaction in a method for using sensing capability information according to an embodiment of this application.

FIG. 8A is a schematic diagram of interaction in a method for using sensing capability information according to an embodiment of this application. As shown in FIG. 8A, the method for using sensing capability information may include the following steps.

Step S401: A cloud server sends sensing capability information to an in-vehicle device.

Step S402: A roadside device sends sensing capability information to the in-vehicle device.

In this embodiment of this application, the sensing capability information may be generated by the cloud server or the roadside device. When the sensing capability information is generated by the cloud server, the cloud server may directly send the sensing capability information to the in-vehicle device through a cellular network. Optionally, when the sensing capability information is generated by the cloud server, the cloud server may further send the sensing capability information to the roadside device through a cellular network. Then, the roadside device forwards the sensing capability information to the in-vehicle device through a V2X network. When the sensing capability information is generated by the roadside device, the roadside device may directly send the sensing capability information to the in-vehicle device through the V2X network. In this case, step S401 may be skipped. It may be understood that one or both of steps S401 and S402 may be performed, and the two steps may be performed sequentially or simultaneously.

Step S403: The in-vehicle device receives the sensing capability information.

In this step, the sensing capability information received by the in-vehicle device is from the cloud server and/or the roadside device.

Step S404: The in-vehicle device determines, based on the sensing capability information, a region in which a sensing capability of the roadside device is lower than a sensing threshold, and generates warning prompt information used to prompt a driver to take over a vehicle in the region.

The in-vehicle device may determine, based on the received sensing capability information, regions in which sensing capabilities are lower than the sensing threshold. In these regions, performance of the roadside device in sensing a traffic participant is poor, and a traffic participant that actually exists may not be sensed. Consequently, a risk of self-driving is high. In order to improve safety, the in-vehicle device may generate the warning prompt information, to prompt the driver to take over the vehicle in the region in which the sensing capability is lower than the sensing threshold.

Step S405: The in-vehicle device adjusts, based on the sensing capability information, confidence of information that is about each region and that is sensed by the roadside device.

Based on the sensing capability information, the in-vehicle device may determine that specific roadside devices have good sensing performance in specific regions and specific roadside devices have poor sensing performance in specific regions. For example, a roadside device 1 has good sensing performance in a region 1 but poor sensing performance in a region 2, and a roadside device 2 has good sensing performance in the region 2 but poor sensing performance in a region 3. In this case, the in-vehicle device may increase confidence of information that is about the region 1 and that is obtained by the roadside device 1, but reduce confidence of information that is about the region 2 and that is obtained by the roadside device 1. In addition, the in-vehicle device may increase confidence of information that is about the region 2 and that is obtained by the roadside device 2, but reduce confidence of information that is about the region 3 and that is obtained by the roadside device 2. In this way, when performing self-driving in the region 2, the vehicle can be more dependent on information that is about the region 2 and that is sensed by the vehicle and the information that is about the region 2 and that is sensed by the roadside device 2, but less dependent on the information that is about the region 2 and that is sensed by the roadside device 1. This improves self-driving safety.

Step S406: The in-vehicle device determines, based on the sensing capability information, the region in which the sensing capability of the roadside device is lower than the sensing threshold, and plans, during driving route planning, a driving route that bypasses the region.

After determining, based on the received sensing capability information, the region in which the sensing capability is lower than the sensing threshold, the in-vehicle device may bypass the region during route planning and implementation. This helps improve self-driving safety.

It may be understood that the in-vehicle device may perform one or more of steps S404 to S406. When a plurality of steps S404 to S406 are performed, an execution sequence is not limited.

Figure 8B:
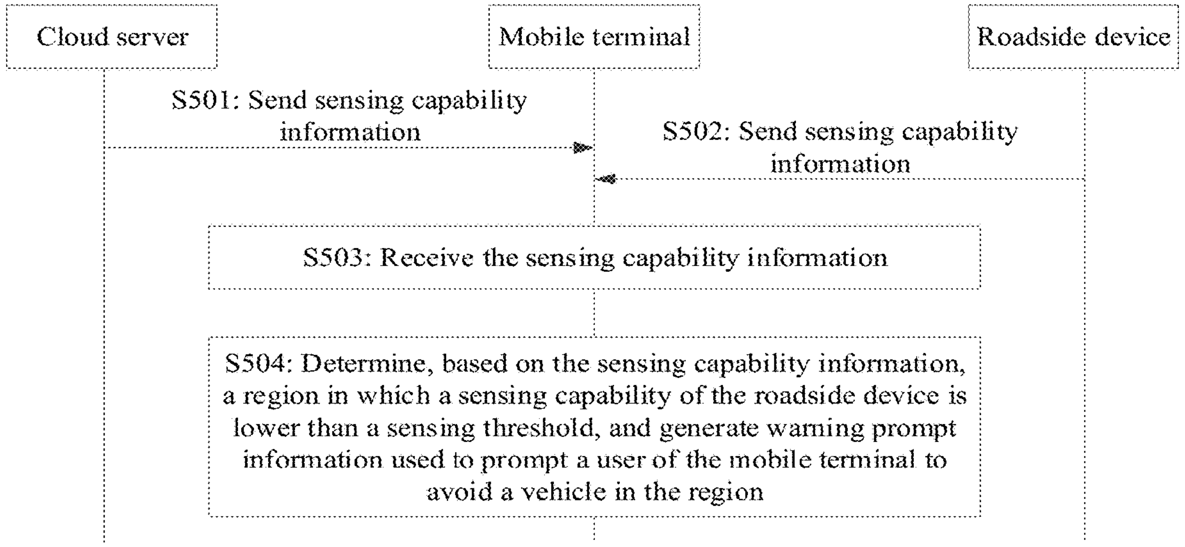
FIG. 8B is a schematic diagram of interaction in a method for using sensing capability information according to an embodiment of this application.

FIG. 8B is a schematic diagram of interaction in a method for using sensing capability information according to an embodiment of this application. As shown in FIG. 8B, the method for using sensing capability information may include the following steps.

Step S501: A cloud server sends sensing capability information to a mobile terminal.

Step S502: A roadside device sends sensing capability information to the mobile terminal.

Step S503: The mobile terminal receives the sensing capability information.

For step S501 to S503, refer to steps S401 to S403. Details are not described herein.

Step S504: The mobile terminal determines, based on the sensing capability information, a region in which a sensing capability of the roadside device is lower than a sensing threshold, and generates warning prompt information used to prompt a user of the mobile terminal to avoid a vehicle in the region.

The roadside device has poor sensing performance in the region in which the sensing capability is lower than the sensing threshold. Consequently, the roadside device may not be able to sense some traffic participants in the region, and cannot prompt the user of the mobile terminal of a surrounding vehicle or pedestrian in a timely manner. Therefore, after determining, based on the received sensing capability information, the region in which the sensing capability is lower than the sensing threshold, the mobile terminal may prompt the user of the mobile terminal to avoid a vehicle in the region. This improves travel safety of the user.

Figure 8C:
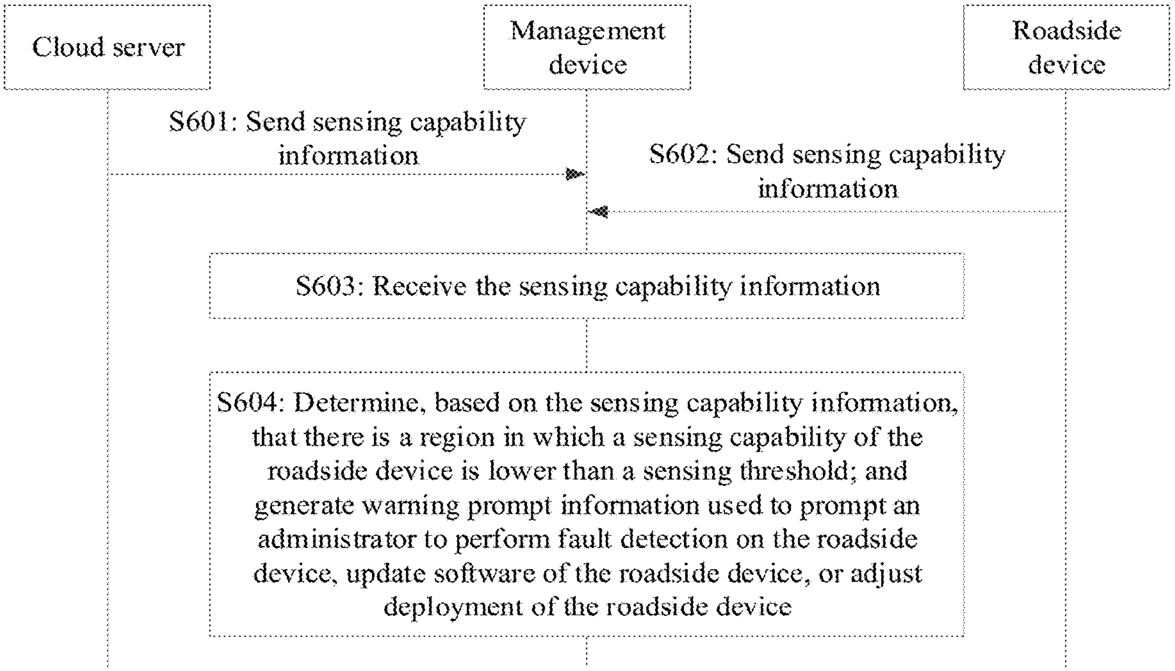
FIG. 8C is a schematic diagram of interaction in a method for using sensing capability information according to an embodiment of this application.

FIG. 8C is a schematic diagram of interaction in a method for using sensing capability information according to an embodiment of this application. As shown in FIG. 8C, the method for using sensing capability information may include the following steps.

Step S601: A cloud server sends sensing capability information to a management device of a roadside device.

Step S602: The roadside device sends sensing capability information to the management device.

Step S603: The management device receives the sensing capability information.

For steps S601 to S603, refer to steps S401 to S403. Details are not described herein.

Step S604: The management device determines, based on the sensing capability information, that there is a region in which a sensing capability of the roadside device is lower than a sensing threshold, and generates warning prompt information used to prompt an administrator to perform fault detection on the roadside device, update software of the roadside device, or adjust deployment of the roadside device.

When there is the region in which the sensing capability is lower than the sensing threshold, it indicates that the sensing capability of the roadside device needs to be further improved, or deployment of the roadside device is inappropriate. Therefore, the management device of the roadside device may prompt the administrator to perform fault detection on the roadside device, update the software of the roadside device, or adjust the deployment of the roadside device, so that the roadside device can have a wider sensing range and better sensing performance.

The roadside device may be blocked by a new plant, a new building, or the like. A roadside sensing apparatus of the roadside device may also be blocked by a foreign object or damaged. In addition, the roadside sensing apparatus of the roadside device may encounter an identification exception due to a climate or weather reason (such as an excessively high temperature, heavy haze, or sand and dust), a sensing algorithm of the roadside device is updated, the roadside sensing apparatus of the roadside device is replaced, and the like. Consequently, the sensing range of the roadside device changes. Therefore, the method for generating a sensing capability in this embodiment of this application may be used to update generated sensing capability information. The following uses a process of updating the first sensing capability information of the first roadside device as an example for description.

In a possible implementation, the method further includes updating the first sensing capability information when a preset condition is met.

In an example, the preset condition includes but is not limited to the following condition: fault maintenance is performed on the first roadside device, a sensor of the first roadside device is replaced, or the first roadside device is upgraded, or a current value, indicated by the first sensing capability information, of a sensing capability indicator is abnormal relative to a statistical value of the sensing capability indicator.

It may be understood that after fault maintenance is performed on the first roadside device, the sensor of the first roadside device is replaced, or the first roadside device is upgraded, the sensing capability of the roadside device may change greatly. Therefore, the first sensing capability information needs to be updated, to improve accuracy.

That a current value, indicated by the first sensing capability information, of a sensing capability indicator is abnormal relative to a statistical value of the sensing capability indicator is described below. The current value, indicated by the first sensing capability information, of the sensing capability indicator may indicate sensing capability information obtained in a first time period before a current moment. The statistical value, indicated by the first sensing capability information, of the sensing capability indicator indicates sensing capability information obtained in a second time period before the current moment. Duration of the first time period is shorter than duration of the second time period, and the first time period is later than the second time period.

For a method for generating the current value of the sensing capability indicator and the statistical value of the sensing capability indicator, refer to a method for generating the first sensing capability information. The preset time period used in a process of generating the first sensing capability information is replaced with the first time period to obtain the current value of the sensing capability indicator. The preset time period used in the process of generating the first sensing capability information is replaced with the second time period to obtain the statistical value of the sensing capability indicator.

If the current value of the sensing capability indicator and the statistical value of the sensing capability indicator meet an abnormal condition, it may be determined that the current value of the sensing capability indicator is abnormal relative to the statistical value of the sensing capability indicator. In this case, a current sensing capability of the first roadside device changes greatly compared with a previous sensing capability. Therefore, the first sensing capability information needs to be updated, to improve accuracy.

In a possible implementation, that the current value of the sensing capability indicator and the statistical value of the sensing capability indicator meet an abnormality condition includes: a difference between a first sensing region and a second sensing region that correspond to a target sensing capability level is greater than a first difference threshold corresponding to the target sensing capability level. The target sensing capability level is any one of sensing capability levels for the first roadside device, the first sensing region is a sensing region corresponding to the target sensing capability level indicated by the current value of the sensing capability indicator, and the second sensing region is a sensing region corresponding to the target sensing capability level indicated by the statistical value of the sensing capability indicator.

For example, the current value of the sensing capability indicator indicates that a sensing capability level of a region 111 is a level 1 and a sensing capability level of a region 121 is a level 2. The statistical value of the sensing capability indicator indicates that a sensing capability level of a region 21 is the level 1 and a sensing capability level of a region 22 is the level 2. When a difference between the region 111 and the region 21 is greater than the first difference threshold, and/or a difference between the region 121 and the region 22 is greater than the first difference threshold, it indicates that the sensing capability of the first roadside device changes greatly. In this case, it may be determined that the current value of the sensing capability indicator is abnormal relative to the statistical value of the sensing capability indicator. In an example, the first difference threshold may indicate a location difference. When a distance between a location of the region 111 and a location of the region 21 is greater than the first difference threshold, it may be determined that the current value of the sensing capability indicator is abnormal relative to the statistical value of the sensing capability indicator. In another example, the first difference threshold may indicate an area difference. When a difference between an area of the region 111 and an area of the region 21 is greater than the first difference threshold, it may be determined that the current value of the sensing capability indicator is abnormal relative to the statistical value of the sensing capability indicator. It should be noted that the foregoing first difference thresholds are merely examples for description, and do not constitute a limitation.

Optionally, a weighting operation may be performed on a difference between a first sensing region and a second sensing region that correspond to each sensing capability level. When an operation result is greater than a second difference threshold, it is determined that the current value of the sensing capability indicator is abnormal relative to the statistical value of the sensing capability indicator. For the second difference threshold, refer to the first difference threshold. Details are not described herein.

In this embodiment of this application, a manner of comparing sensing regions of a same sensing capability level is used, which is convenient, highly intelligible, and easy to be understood by a user.

In a possible implementation, that the current value of the sensing capability indicator and the statistical value of the sensing capability indicator meet an abnormality condition includes, in a sensing region corresponding to a target sensing capability level indicated by the statistical value of the sensing capability indicator, a proportion of a quantity of first target location points obtained by matching a current roadside sensing result with a current multi-source fusion sensing result to a quantity of location points in a second group of location points indicated by the current multi-source fusion sensing result is lower than a third difference threshold. The current roadside sensing result is a roadside sensing result obtained in a process of generating the current value of the sensing capability indicator, and the current multi-source fusion sensing result is a multi-source fusion sensing result obtained in a process of generating the current value of the sensing capability indicator. The first target location point is a target location point whose matching result is FN.

When the proportion of the quantity of first target location points to the quantity of location points in the second group of location points is lower than the third difference threshold, it indicates that a large quantity of locations points in the sensing region corresponding to the target sensing capability level are not detected. In other words, the first roadside device has poor performance in sensing a traffic participant in the sensing region corresponding to the target sensing capability level. Therefore, it may be determined that the current value of the sensing capability indicator is abnormal relative to the statistical value of the sensing capability indicator. The third difference threshold may be set based on a requirement. In an example, the third difference threshold corresponds to the target sensing capability level. A stronger sensing capability corresponding to the target sensing capability level indicates a smaller value of the third difference threshold, and a weaker sensing capability corresponding to the target sensing capability level indicates a larger value of the third difference threshold.

For example, a sensing region corresponding to a target sensing capability level “level 1” indicated by the statistical value of the sensing capability indicator is a region 21, and the third difference threshold corresponding to the target sensing capability level “level 1” is a threshold 1. In the region 21, a quantity of first target location points obtained by matching the current roadside sensing result with the current multi-source fusion sensing result is a quantity 1, a quantity of location points in the second group of location points indicated by the current multi-source fusion sensing result is a quantity 2, and a proportion of the quantity 1 to the quantity 2 is lower than the level 1. In this case, it may be determined that the current value of the sensing capability indicator is abnormal relative to the statistical value of the sensing capability indicator.

In this embodiment of this application, quantities of location points are compared in a process of generating the current value of the sensing capability indicator, so that an abnormality can be detected in a timely manner, and an update can be immediately triggered when the abnormality is detected.

Figure 9:
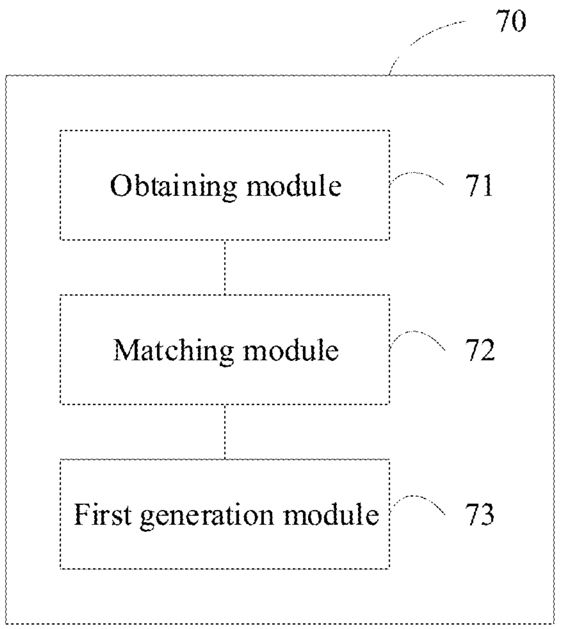
FIG. 9 is a schematic diagram depicting a structure of an apparatus for generating sensing capability information according to an embodiment of this application.

FIG. 9 is a schematic diagram depicting a structure of an apparatus for generating sensing capability information according to an embodiment of this application. The apparatus may be applied to a cloud server or a first roadside device. As shown in FIG. 9, an apparatus 70 includes an obtaining module 71, a matching module 72, and a first generation module 73.

The obtaining module 71 is configured to obtain a roadside sensing result and a multi-source fusion sensing result, where the roadside sensing result indicates a first group of location points that are of a traffic participant sensed by a first roadside device in a preset time period, and the multi-source fusion sensing result indicates a second group of location points obtained by fusing a plurality of groups of location points that are of the traffic participant and that are obtained by a plurality of sensing devices in the preset time period.

The matching module 72 is configured to match the roadside sensing result obtained by the obtaining module 71 with the multi-source fusion sensing result obtained by the obtaining module 71, to obtain matching results of a plurality of target location points.

The first generation module 73 is configured to generate first sensing capability information of the first roadside device based on the matching results obtained by the matching module 72, where the first sensing capability information indicates a sensing capability of the first roadside device.

In a possible implementation, the first sensing capability information indicates a first region and a sensing capability of the first roadside device in the first region.

In a possible implementation, the first sensing capability information indicates a first scenario, a first region, and a sensing capability of the first roadside device in the first scenario in the first region.

In a possible implementation, the roadside sensing result and the multi-source fusion sensing result are sensing results in a same scenario.

In a possible implementation, the roadside sensing result includes at least one of time information, location information, a motion parameter, and attribute information of each location point in the first group of location points, and the multi-source fusion sensing result includes at least one of time information, location information, a motion parameter, and attribute information of each location point in the second group of location points.

In a possible implementation, the apparatus further includes a second generation module and a third generation module.

The second generation module is configured to generate a plurality of pieces of sensing capability information for a plurality of roadside devices, where the plurality of pieces of sensing capability information indicate sensing capabilities of the plurality of roadside devices, the plurality of roadside devices include the first roadside device, and the plurality of pieces of sensing capability information include the first sensing capability information.

The third generation module is configured to generate sensing coverage hole information based on the plurality of pieces of sensing capability information, where the sensing coverage hole information indicates a region out of coverage of one or more roadside devices in the plurality of roadside devices.

In a possible implementation, the region out of coverage of one or more roadside devices in the plurality of roadside devices includes an absolute coverage hole and/or a relative coverage hole, a sensing capability of each of the plurality of roadside devices cannot meet a sensing capability criterion in the absolute coverage hole, and sensing capabilities of some of the plurality of roadside devices cannot meet the sensing capability criterion in the relative coverage hole.

In a possible implementation, the apparatus further includes an updating module.

The updating module is configured to update the first sensing capability information when a preset condition is met.

The preset condition includes a current value, indicated by the first sensing capability information, of a sensing capability indicator is abnormal relative to a statistical value of the sensing capability indicator, fault maintenance is performed on the first roadside device, a sensor of the first roadside device is replaced, or the first roadside device is upgraded.

In a possible implementation, the apparatus further includes a fourth generation module.

The fourth generation module is configured to generate warning prompt information based on the first sensing capability information, where the warning prompt information is used to prompt a driver to take over a vehicle in a second region, perform fault detection on the first roadside device, update software of the first roadside device, adjust deployment of the first roadside device, reduce confidence of information that is about a second region and that is sensed by the first roadside device, or bypass a second region during route planning. The first sensing capability information indicates that a sensing capability of the first roadside device in the second region is lower than a sensing threshold.

Figure 10:
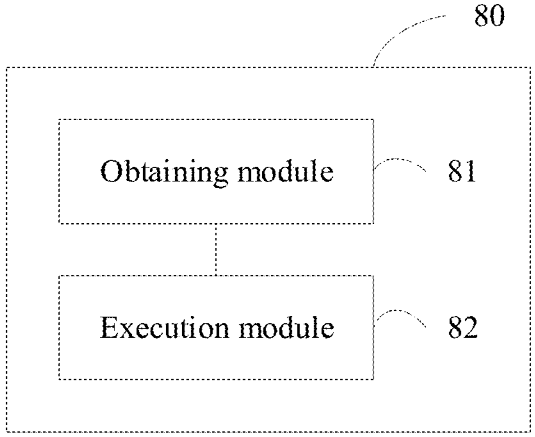
FIG. 10 is a schematic diagram depicting a structure of an apparatus for using sensing capability information according to an embodiment of this application.

FIG. 10 is a schematic diagram depicting a structure of an apparatus for using sensing capability information according to an embodiment of this application. As shown in FIG. 10, an apparatus 80 includes an obtaining module 81 and an execution module 82.

The obtaining module 81 is configured to obtain sensing capability information, where the sensing capability information indicates a region and a sensing capability of a roadside device in the region.

The execution module 82 is configured to, based on the sensing capability information obtained by the obtaining module 81, generate warning prompt information, adjust confidence of information that is about the region and that is sensed by the roadside device, or plan a driving route that bypasses the region. Obtaining of the sensing capability information may be receiving the sensing capability information or generating the sensing capability information.

In a possible implementation, the sensing capability information further indicates a scenario and a sensing capability of the roadside device in the scenario in the region.

In a possible implementation, the warning prompt information is used to prompt a driver to take over a vehicle in the region, avoid a vehicle in the region, perform fault detection on the roadside device, reduce the confidence of the information that is about the region and that is sensed by the roadside device, or bypass the region during route planning, where the sensing capability information indicates that the sensing capability of the roadside device in the region is lower than a sensing threshold.

In a possible implementation, the apparatus is in an in-vehicle device, and that the warning prompt information is generated based on the sensing capability information includes determining that the sensing capability is lower than the sensing threshold, and prompting the driver to take over the vehicle in the region.

In a possible implementation, the apparatus is in an in-vehicle device, and that the driving route that bypasses the region is planned based on the sensing capability information includes determining that the sensing capability is lower than the sensing threshold, and planning the driving route, where the driving route bypasses the region.

In a possible implementation, the apparatus is in a mobile terminal, and that the warning prompt information is generated based on the sensing capability information includes determining that the sensing capability is lower than the sensing threshold, and prompting a user of the mobile terminal to avoid a vehicle.

In a possible implementation, the apparatus is in a management device of the roadside device, and that the warning prompt information is generated based on the sensing capability information includes determining that the sensing capability is lower than the sensing threshold, and prompting an administrator to perform fault detection on the roadside device, updating software of the roadside device, or adjusting deployment of the roadside device.

In a possible implementation, there are a plurality of roadside devices, and the region includes an absolute coverage hole. The absolute coverage hole is a region in which a sensing capability of a sensing capability of each of the plurality of roadside devices cannot meet a sensing capability criterion.

In a possible implementation, there are a plurality of roadside devices, and the region includes a relative coverage hole. The relative coverage hole is a region in which sensing capabilities of sensing capabilities of some of the plurality of roadside devices cannot meet a sensing capability criterion.

Figure 11:
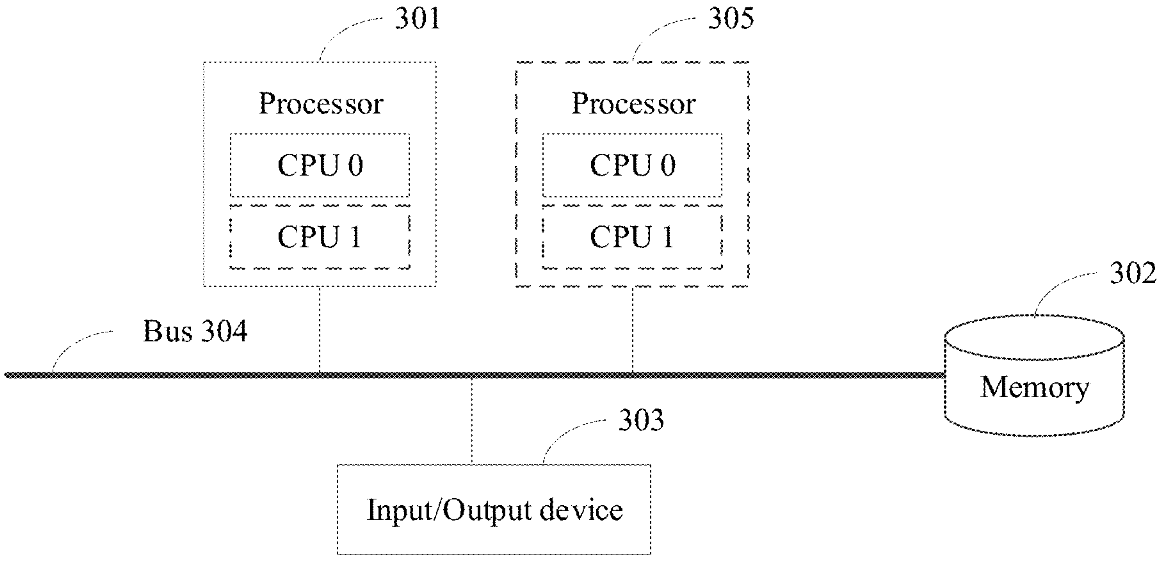
FIG. 11 is a schematic diagram of an electronic device according to an embodiment of this application.

FIG. 11 is a schematic diagram of an electronic device according to an embodiment of this application. The electronic device may perform the method shown in FIG. 2 or FIG. 7. In addition, the electronic device may be a cloud device (such as a server), a roadside device (such as an RSU), a terminal device (such as a vehicle or a portable terminal), or a component, a module, or a chip inside these devices.

As shown in FIG. 11, the electronic device may include at least one processor 301, a memory 302, an input/output device 303, and a bus 304. The following describes in detail components of the electronic device with reference to FIG. 11.

The processor 301 is a control center of the electronic device, and may be one processor or may be a collective name of a plurality of processing elements. For example, the processor 301 may be a universal integrated circuit, may be an application-specific integrated circuit (ASIC), or may be one or more integrated circuits configured to implement embodiments of the present disclosure, for example, one or more microprocessors (digital signal processors (DSP)), or one or more field-programmable gate arrays (FPGAs).

The processor 301 may perform various functions of the electronic device by running or executing a software program stored in the memory 302 and invoking data stored in the memory 302.

During specific implementation, in an embodiment, the processor 301 may include one or more central processing units (CPUs) such as a CPU 0 and a CPU 1 in the figure.

During specific implementation, in an embodiment, the electronic device may include a plurality of processors such as the processor 301 and a processor 305 in FIG. 11. Each of these processors may be a single-core processor (single-CPU), or may be a multi-core processor (multi-CPU). The processor herein may be one or more devices, circuits, and/or processing cores configured to process data (such as computer program instructions).

The memory 302 may be a read-only memory (ROM) or another type of static storage device capable of storing static information and instructions, a random-access memory (RAM) or another type of dynamic storage device capable of storing information and instructions, an electrically erasable programmable ROM (EEPROM), a compact disc (CD) ROM (CD-ROM) or another optical disc storage, an optical disc storage (including a CD, a laser disc, an optical disc, a DIGITAL VERSATILE DISC (DVD), a BLU-RAY disc, or the like), a disk storage medium or another magnetic storage device, or any other medium that can carry or store expected program code in a form of instructions or a data structure and that can be accessed by a computer. However, the memory is not limited thereto. The memory 302 may exist independently, and is connected to the processor 301 through the bus 304. The memory 302 may alternatively be integrated with the processor 301.

The input/output device 303 is configured to communicate with another device or a communication network. For example, the input/output device 303 is configured to communicate with a communication network such as a V2X network, a cellular network, the Ethernet, a radio access network (RAN), or a wireless local area network (WLAN). The input/output device 303 may include a whole baseband processor or a part of a baseband processor, and may further optionally include a radio frequency (RF) processor. The RF processor is configured to send or receive an RF signal. The baseband processor is configured to process a baseband signal converted from an RF signal, or a baseband signal to be converted into an RF signal.

During specific implementation, in an embodiment, the input/output device 303 may include a transmitter and a receiver. The transmitter is configured to send a signal to another device or a communication network, and the receiver is configured to receive a signal sent by the other device or the communication network. The transmitter and the receiver may exist independently, or may be integrated together.

The bus 304 may be an Industry Standard Architecture (ISA) bus, a Peripheral Component Interconnect (PCI) bus, an Extended ISA (EISA) bus, or the like. The bus may include an address bus, a data bus, a control bus, and the like. For ease of representation, only one bold line is used to represent the bus in FIG. 11, but this does not mean that there is only one bus or only one type of bus.

A structure of the device shown in FIG. 11 does not constitute a limitation on an electronic device, and the device may include more or fewer components than those shown in the figure, or combine some components, or have different component arrangements.

An embodiment of this application provides a nonvolatile computer-readable storage medium. The nonvolatile computer-readable storage medium stores computer program instructions, and when the computer program instructions are executed by a processor, the foregoing method for generating sensing capability information or the foregoing method for using sensing capability information is performed.

An embodiment of this application provides a computer program product, including computer-readable code or a nonvolatile computer-readable storage medium carrying computer-readable code. When the computer-readable code is run in a processor of an electronic device, the processor in the electronic device performs the foregoing method for generating sensing capability information or the foregoing method for using sensing capability information.

The computer-readable storage medium can be a tangible device that can retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include a portable computer disk, a hard disk, a RAM, a ROM, an erasable programmable ROM (an EPROM or a flash memory), a static RAM (SRAM), a portable CD-ROM, a DVD, a memory stick, a floppy disk, a mechanical coding device, such as a punching card that stores instructions or a convex structure in a groove that stores instructions, and any suitable combination thereof.

Computer-readable program instructions or code described herein can be downloaded to computing/processing devices from a computer-readable storage medium or downloaded to an external computer or external storage device through a network such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in this application may be assembly instructions, instruction set architecture instructions, machine instructions, machine-related instructions, microcode, firmware instructions, status setting data, or source code or object code written in any combination of one or more programming languages. The programming languages include an object-oriented programming language such as Smalltalk or C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer through any type of network, including a local area network (LAN) or a wide area network (WAN), or may be connected to an external computer (for example, through the Internet provided by an internet service provider). In some embodiments, an electronic circuit, such as a programmable logic circuit, an FPGA, or a programmable logic array (PLA), is customized based on status information of computer-readable program instructions. The electronic circuit may execute the computer-readable program instructions, to implement various aspects of this application.

These computer-readable program instructions may be provided to a processor of a general-purpose computer, a special-purpose computer, or another programmable data processing apparatus to produce a machine, so that the instructions, when executed by the processor of the computer or the other programmable data processing apparatus, create an apparatus for implementing functions/actions specified in one or more blocks in the flowcharts and/or block diagrams. Alternatively, these computer-readable program instructions may be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of the functions/actions specified in the one or more blocks in the flowcharts and/or the block diagrams.

Alternatively, the computer-readable program instructions may be loaded onto a computer, another programmable data processing apparatus, or another device so that a series of operation steps are performed on the computer, the other programmable data processing apparatus, or the other device to produce a computer-implemented process. Therefore, the instructions executed on the computer, the other programmable data processing apparatus, or the other device implements the functions/actions specified in the one or more blocks in the flowcharts and/or block diagrams.

The flowcharts and block diagrams in the accompanying drawings show possible implementation of system architectures, functions, and operations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, functions marked in the blocks may also be implemented in a sequence different from that marked in the accompanying drawings. For example, two consecutive blocks may actually be executed in parallel, and may sometimes be executed in a reverse order, which depends on functions involved.

It should also be noted that each block in the block diagrams and/or the flowcharts, and a combination of blocks in the block diagrams and/or the flowcharts may be implemented by hardware (such as a circuit or an ASIC) that performs a corresponding function or action, or may be implemented by a combination of hardware and software, for example, firmware.

Although the present application is described with reference to embodiments, in a process of implementing the present application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

The foregoing has described embodiments of this application. The foregoing descriptions are illustrative, not exhaustive, and are not limited to the disclosed embodiments. Many modifications and variations are apparent to a person of ordinary skill in the art without departing from the scope of the illustrated embodiments. The selection of terms used herein is intended to best explain the principles of the embodiments, practical applications, or improvements to technologies in the market, or to enable another person of ordinary skill in the art to understand the embodiments disclosed herein.

What is claimed is:

1. A first roadside device comprising:

a memory configured to store programming instructions; and at least one processor coupled to the memory and configured to execute the programming instructions to cause the apparatus to:

obtain a roadside sensing result indicating a first group of location points of a traffic participant in a preset time period;

obtain a multi-source fusion sensing result indicating a second group of location points that is a fusion of third groups of location points that are of the traffic participant and that are from sensing devices in the preset time period;

match the roadside sensing result with the multi-source fusion sensing result to obtain matching results of target location points, wherein the matching results comprise a true positive (TP) indicator, a false negative (FN) indicator, or a false positive (FP) indicator for the target location points, wherein the TP indicator indicates a target location point of the target location points is in the second group with a first matching location point in the first group, wherein the FN indicator indicates the target location point is in the second group without a second matching location point in the first group, and wherein the FP indicator indicates the target location point is in the first group without a third matching location point in the second group; and generate first sensing capability information of the first roadside device based on the matching results, wherein the first sensing capability information indicates a first region and a first sensing capability of the first roadside device in the first region.

2. The apparatus of claim 1, wherein the first sensing capability information further indicates a first scenario, the first region, and the first sensing capability of the first roadside device in the first scenario in the first region.

3. The apparatus of claim 1, wherein the roadside sensing result and the multi-source fusion sensing result are based on a same scenario.

4. The apparatus of claim 1, wherein the roadside sensing result comprises at least one of first time information, first location information, a first motion parameter, or first attribute information of each location point in the first group, and wherein the multi-source fusion sensing result comprises at least one of second time information, second location information, a second motion parameter, or second attribute information of each location point in the second group.

5. The apparatus of claim 1, wherein the at least one processor is further configured to execute the programming instructions to cause the apparatus to:

generate second sensing capability information for second roadside devices, wherein the second sensing capability information indicates second sensing capabilities of the second roadside devices, wherein the second roadside devices comprise the first roadside device, and wherein the second sensing capability information comprises the first sensing capability information; and generate sensing coverage hole information based on the second sensing capability information, wherein the sensing coverage hole information indicates a region out of coverage of one or more of the second roadside devices.

6. The apparatus of claim 5, wherein the region out of coverage comprises an absolute coverage hole or a relative coverage hole, wherein all of the second sensing capabilities do not meet a sensing capability criterion in the absolute coverage hole, and wherein some of the second sensing capabilities do not meet the sensing capability criterion in the relative coverage hole.

7. The apparatus of claim 1, wherein the at least one processor is further configured to execute the programming instructions to cause the apparatus to update the first sensing capability information when a preset condition is met, and wherein the preset condition comprises:

a current value of a sensing capability indicator indicated by the first sensing capability information is abnormal relative to a statistical value of the sensing capability indicator;

a fault maintenance is performed on the first roadside device;

a sensor of the first roadside device is replaced; or the first roadside device is upgraded.

8. The apparatus of claim 7, wherein that the current value is abnormal relative to the statistical value comprises a difference between a first sensing region and a second sensing region that correspond to a target sensing capability level is greater than a first difference threshold corresponding to the target sensing capability level, wherein the target sensing capability level is a sensing capability level for the first roadside device, wherein the first sensing region corresponds to the target sensing capability level indicated by the current value, and wherein the second sensing region corresponds to the target sensing capability level indicated by the statistical value.

9. The apparatus of claim 1, wherein the at least one processor is further configured to execute the programming instructions to cause the apparatus to generate warning prompt information based on the first sensing capability information, wherein the warning prompt information prompts a driver to take over a vehicle in a region, perform fault detection on the first roadside device, update software of the first roadside device, adjust deployment of the first roadside device, reduce confidence of information that is about the region and that is sensed by the first roadside device, or bypass the region during route planning, and wherein the first sensing capability information indicates that a second sensing capability of the first roadside device in the region is lower than a sensing threshold.

10. An apparatus comprising:

a memory configured to store programming instructions; and at least one processor coupled to the memory and configured to execute the programming instructions to cause the apparatus to:

obtain sensing capability information indicating a region and a first sensing capability of a roadside device in the region, wherein the sensing capability information is based on matching results comprising a true positive (TP) indicator, a false negative (FN) indicator, or a false positive (FP) indicator for target location points, wherein the TP indicator indicates a target location point of the target location points is in a second group of location points with a first matching location point in a first group of location points, wherein the FN indicator indicates the target location point is in the second group without a second matching location point in the first group, and wherein the FP indicator indicates the target location point is in the first group without a third matching location point in the second group; and based on the sensing capability information:

generate warning prompt information;

adjust a confidence of information that is about the region and that is from the roadside device; or plan a driving route bypassing the region.

11. The apparatus of claim 10, wherein the sensing capability information further indicates a scenario and the first sensing capability in the scenario in the region.

12. The apparatus of claim 11, wherein the apparatus is disposed in an in-vehicle device, and wherein the at least one processor is further configured to execute the programming instructions to cause the apparatus to:

determine that the first sensing capability is lower than a sensing threshold; and prompt a driver to take over a vehicle in the region.

13. The apparatus of claim 11, wherein the apparatus is disposed in an in-vehicle device, and wherein the at least one processor is further configured to execute the programming instructions to cause the apparatus to:

determine that the second sensing capability is lower than a sensing threshold; and plan the driving route.

14. The apparatus of claim 11, wherein the apparatus is disposed in a mobile terminal, and wherein the at least one processor is further configured to execute the programming instructions to cause the apparatus to:

determine that the second sensing capability is lower than a sensing threshold; and prompt a user of the mobile terminal to avoid a vehicle in the region.

15. The apparatus of claim 11, wherein the apparatus is disposed in a management device of the roadside device, and wherein the at least one processor is further configured to execute the programming instructions to cause the apparatus to:

determine that the second sensing capability is lower than a sensing threshold; and prompt an administrator to perform a fault detection on the roadside device, update software of the roadside device, or adjust deployment of the roadside device.

16. The apparatus of claim 11, wherein the region comprises a relative coverage hole in which second sensing capabilities of some of second roadside devices do not meet a sensing capability criterion.

17. The apparatus of claim 10, wherein the region comprises an absolute coverage hole in which second sensing capabilities of all second roadside devices do not meet a sensing capability criterion.

18. The apparatus of claim 10, wherein the warning prompt information prompts a driver to take over a vehicle in the region, avoid the vehicle in the region, perform fault detection on the roadside device, reduce the confidence of information, or bypass the region during route planning, and wherein the sensing capability information indicates that the first sensing capability is lower than a sensing threshold.

19. A method comprising:

obtaining a roadside sensing result indicating a first group of location points of a traffic participant in a preset time period;

obtaining a multi-source fusion sensing result indicating a second group of location points that is a fusion of third groups of location points that are of the traffic participant and that are from sensing devices in the preset time period;

matching the roadside sensing result with the multi-source fusion sensing result to obtain matching results of target location points, wherein the matching results comprise a true positive (TP) indicator, a false negative (FN) indicator, or a false positive (FP) indicator for the target location points, wherein the TP indicator indicates a target location point of the target location points is in the second group with a first matching location point in the first group, wherein the FN indicator indicates the target location point is in the second group without a second matching location point in the first group, and wherein the FP indicator indicates the target location point is in the first group without a third matching location point in the second group; and generating first sensing capability information of the first roadside device based on the matching results, wherein the first sensing capability information indicates a first region and a first sensing capability of the first roadside device of the first roadside device in the first region.

20. The method of claim 19, wherein the first sensing capability information further indicates a first scenario, the first region, and the first sensing capability of the first roadside device in the first scenario in the first region.

* * * * *